US012759606B1

(12) United States Patent
Behel

(10) Patent No.: US 12,759,606 B1
(45) Date of Patent: Oct. 13, 2026

(54) MULTI-UTILITY MODULAR DEVICE

(71) Applicant: Kevin Donald Behel, Port St. Lucie, FL (US)

(72) Inventor: Kevin Donald Behel, Port St. Lucie, FL (US)

( * ) Notice: Subject to any disclaimer, the term of this patent is extended or adjusted under 35 U.S.C. 154(b) by 372 days.

(21) Appl. No.: 18/538,435

(22) Filed: Dec. 13, 2023

Related U.S. Application Data

(60) Provisional application No. 63/539,383, filed on Sep. 20, 2023.

(51) Int. Cl.

| | |
|---|---|
| ***B62B 3/04*** | (2006.01) |
| ***A01D 34/416*** | (2006.01) |
| ***A01D 34/64*** | (2006.01) |
| ***A01D 101/00*** | (2006.01) |
| ***A01G 20/47*** | (2018.01) |
| ***B62B 5/00*** | (2006.01) |
| ***E01H 5/06*** | (2006.01) |

(52) U.S. Cl.
CPC .............. *B62B 3/04* (2013.01); *A01D 34/416* (2013.01); *A01D 34/64* (2013.01); *A01G 20/47* (2018.02); *B62B 5/0013* (2013.01); *B62B 5/0076* (2013.01); *E01H 5/061* (2013.01); *A01D 2101/00* (2013.01); *B62B 2203/00* (2013.01)

(58) Field of Classification Search
CPC ....... B62B 3/04; B62B 5/0013; B62B 5/0076; B62B 2203/00; A01G 20/47; A01D 34/416; A01D 34/64; A01D 2101/00; E01H 5/061
See application file for complete search history.

(56) References Cited

U.S. PATENT DOCUMENTS

| | | | | |
|---|---|---|---|---|
| 4,596,347 | A | 6/1986 | Hite | |
| 4,645,264 | A | 2/1987 | Morrison | |
| 4,998,948 | A * | 3/1991 | Osterling | A01D 34/64 56/12.6 |
| 5,284,218 | A | 2/1994 | Rusher, Jr. | |
| 6,155,648 | A | 12/2000 | Dombek et al. | |
| 6,293,627 | B1 | 9/2001 | Jansen et al. | |
| 7,641,285 | B2 | 1/2010 | Jacobs | |

(Continued)

FOREIGN PATENT DOCUMENTS

| | | |
|---|---|---|
| CA | 484791 A | 7/1952 |
| WO | 2007069914 A1 | 6/2007 |

*Primary Examiner* — James A Shriver, II
*Assistant Examiner* — Nicholas R. Kandas
(74) *Attorney, Agent, or Firm* — John Rizvi; John Rizvi, P.A.—The Patent Professor®

(57) ABSTRACT

A multi-utility modular device, comprising a base chassis is provided. The base chassis comprises a first attachment, comprising at least one first adjustable extension arm, configured to allow removable coupling of one or more objects on the top of the base chassis. The one or more objects comprise a dump-bed, a cart, a lifting table, a seating arrangement, a tool-box, a work-station, or a planter. The base chassis comprises a second attachment, comprising at least one second adjustable extension arm with a drop-design structure, configured to allow removable coupling of a lawnmower on the bottom of the base chassis under the one or more objects. The base chassis comprises a third attachment configured to allow removable coupling of one or more accessories on at least one side of the base chassis. The one or more accessories comprise a weed-eater or a leaf blower.

17 Claims, 22 Drawing Sheets

(56) References Cited

U.S. PATENT DOCUMENTS

| | | | | |
|---|---|---|---|---|
| 10,654,392 | B2 | 5/2020 | Danner | |
| 10,779,467 | B2 * | 9/2020 | Skoog | A01D 34/82 |
| 11,780,078 | B2 * | 10/2023 | Wong | B25J 9/0087 700/253 |
| 2002/0175007 | A1 * | 11/2002 | Strong | B62D 31/003 180/54.1 |
| 2011/0215211 | A1 | 9/2011 | Wohlgemuth | |
| 2022/0232750 | A1 * | 7/2022 | Shirafuji | A01B 69/008 |
| 2023/0200296 | A1 * | 6/2023 | Zeiler | B60K 7/0007 56/10.1 |

* cited by examiner

MULTI-UTILITY MODULAR DEVICE

CROSS-REFERENCE TO RELATED APPLICATIONS

This application claims the benefit of U.S. Provisional Patent Application Ser. No. 63/539,383 filed on Sep. 20, 2023, which is incorporated by reference herein in its entirety.

FIELD OF THE INVENTION

The present invention relates generally to garden carts, and in particular to a remote controlled multi-utility modular device, which can be employed for lawn maintenance.

BACKGROUND OF THE INVENTION

Generally, wheelbarrows are simple carts designed to move soil, rocks, or other heavy materials in gardening, construction, or agricultural activities. Wheelbarrows mainly feature a simple design, consisting of a wheel, a shallow tray, and two handles for manual pushing or pulling. Although effective for specific tasks, the wheelbarrows are limited in their capabilities and lack adaptability for different applications.

Manual labor-intensive methods of carrying loads on the backs of human beings or with basic wheelbarrows are quite inefficient. The lack of versatility in the wheelbarrows has made them suitable for limited tasks only. Basic modifications to wheelbarrows, such as incorporating larger wheels has improved stability for increased load capacity. However, such modifications have not significantly altered the fundamental limitations of the basic wheelbarrow concept.

Specialized carts are used for specific tasks such as transporting heavy loads in mines, moving goods in markets, or carrying construction materials. The specialized carts are designed for particular purposes and lack the flexibility to be reconfigured or customized for different tasks. In certain cases, craftsmen and workers have attempted to modify wheelbarrows by attaching makeshift extensions, additional trays, or improvised holders to better suit the specific tasks. While these modifications have demonstrated the desire for enhanced functionality, they are often makeshift solutions and lack systematic approach.

Thus, there is a need in the art for a device that can overcome the above limitations. For example, there is a need of a device that is modular, and that can be employed to perform various functions, such as, related to gardening and lawn maintenance.

SUMMARY OF THE INVENTION

The present invention is directed to a multi-utility modular device, comprising: a base chassis, wherein the base chassis comprises: a first attachment, comprising at least one first adjustable extension arm, configured to allow removable coupling of one or more objects on the top of the base chassis, wherein the one or more objects comprise one or more of: a dump-bed, a cart, a lifting table, a seating arrangement, a tool-box, a work-station, or a planter; a second attachment, comprising at least one second adjustable extension arm with a drop-design structure, configured to allow removable coupling of a lawnmower on the bottom of the base chassis under the one or more objects; and a third attachment configured to allow removable coupling of one or more accessories on at least one side of the base chassis, wherein the one or more accessories comprise one or more of: a weed-eater or a leaf blower.

In an aspect, the first attachment may comprise at least one first mounting bracket affixed to the base chassis.

In an aspect, the at least one first adjustable extension arm may be configured to allow upward and downward vertical movement of the one or more objects removably coupled on the top of the base chassis.

In an aspect, the second attachment may comprise at least one second mounting bracket affixed to the base chassis.

In an aspect, the at least one second adjustable extension arm may be configured to allow upward and downward vertical movement of the lawnmower removably coupled on the bottom of the base chassis.

In an aspect, the third attachment may comprise at least one third mounting bracket affixed to the base chassis.

In an aspect, the third mounting bracket may be a quick-release mounting bracket.

In an aspect, the multi-utility modular device may comprise a remote-control functionality for remote operation and control of movement of the multi-utility modular device.

In an aspect, the multi-utility modular device may comprise an LED headlight mounted on a front side of the base chassis, providing illumination for enhanced visibility in low-light.

In an aspect, the multi-utility modular device may comprise a weather proof protective case.

In an aspect, the multi-utility modular device may comprise a winch mechanism enabling effortless lifting and transportation of heavy objects.

In an aspect, the multi-utility modular device may comprise tractor teeth wheel equipped with bolts allowing wheel replacement.

In an aspect, the multi-utility modular device may comprise threaded tracks equipped with bolts allowing wheel replacement, the threaded tracks being suitable for different terrains.

In an aspect, the lawnmower may be of one or more types.

In an aspect, the multi-utility modular device may comprise a battery to supply power to the modular device.

In an aspect, the multi-utility modular device may comprise a battery charger to charge the battery of the modular device.

In an aspect, the multi-utility modular device may comprise a smart battery monitor indicating one or more of battery health, temperature, and remaining power of the battery of the multi-utility modular device.

In an aspect, the multi-utility modular device may comprise a gas power supply.

In an aspect, the multi-utility modular device may comprise an electric power supply.

The present invention is further directed to a multi-utility modular device, comprising: a base chassis; a plurality of adjustable extension arms to allow removable coupling of a lawnmower on the bottom of the base chassis, and an object on the top of base chassis; and at least one mounting bracket configured to allow removable coupling of one or more accessories on one or more sides of the base chassis.

In an aspect, the plurality of adjustable extension arms may comprise a first extension arm configured to allow removable coupling of: a dump-bed, a cart, a lifting table, a seating arrangement, a tool-box, a work-station, or a planter on the top of the base chassis.

In an aspect, the plurality of adjustable extension arms may comprise a second extension arm, with a drop-design structure, configured to allow removable coupling of the lawnmower on the bottom of the base chassis under the object.

In an aspect, the at least one mounting bracket may be affixed to the one or more sides of the base chassis and is configured to allow removable coupling of one or more of a weed-eater and a leaf blower on the one or more sides of the base chassis.

In an aspect, the device may further comprise a tiller, cultivator, or a snowblade mounted on the rear side of the device.

The present invention is further directed to a multi-utility modular device, comprising: a base chassis; one or more objects removably coupled on the top of the base chassis, a lawnmower on the bottom of the base chassis under the one or more objects; one or more accessories removably coupled on at least one side of the base chassis. a first adjustable extension arm configured to allow removable coupling of the one or more objects; a second adjustable extension arm, with a drop-design structure, configured to allow removable coupling of the lawnmower; and an attachment configured to allow removable coupling of the one or more accessories.

In an aspect, the one or more objects may comprise one or more of: a dump-bed, a cart, a lifting table, a seating arrangement, a tool-box, a work-station, and a planter.

In an aspect, the one or more accessories may comprise one or more of: a weed-eater and a leaf blower.

In an aspect, the first adjustable extension arm may be configured to allow upward and downward vertical movement of the one or more objects.

In an aspect, the second adjustable extension arm may be configured to allow upward and downward vertical movement of the lawnmower.

In an aspect, the device may further comprise a first mounting bracket corresponding to the first adjustable extension arm, a second mounting bracket corresponding to the second adjustable extension arm, and a third mounting bracket corresponding to the attachment.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. The term “comprising” can also encompass the terms “consisting essentially of” and “consisting of.” For purposes of description herein, the terms “top”, “bottom”, “upper”, “lower”, “left”, “rear”, “right”, “front”, “vertical”, “horizontal”, “side”, “rear”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed towards a multi-utility modular device, comprising a base chassis. The base chassis comprises one or more attachments comprising one or more adjustable extension arms to allow removable coupling of one or more objects, lawnmower, or one or more accessories on the top, bottom, or at least one side of the base chassis respectively. Overall, the multi-utility modular device is versatile and incorporates interchangeable components, adjustable features, and expandable functionalities into the basic wheel-barrow design, thus increasing the utility of the modular device in various applications. The multi-utility modular device is also referred to as a modular device in some portions of the disclosure.

Figure 1:
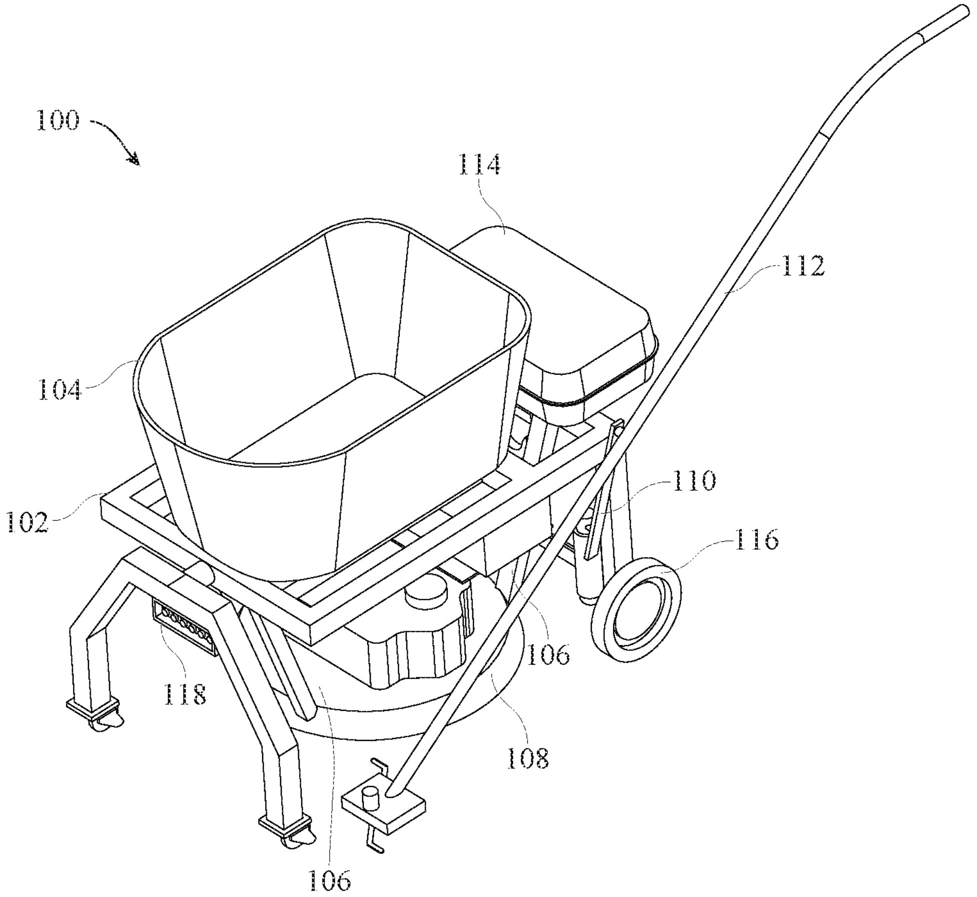
FIG. 1 shows an exemplary front view of a multi-utility modular device, in accordance with some embodiments of the present disclosure.

Referring initially to FIG. 1, which shows an exemplary front view of a multi-utility modular device 100, in accordance with some embodiments of the present disclosure. The multi-utility modular device 100 comprises a base chassis 102. The base chassis 102 is the central component of the multi-utility modular device 100, forming a backbone to enable versatility, adaptability, and efficiency in a variety of applications. The base chassis 102 may serve as the core structure on which one or more objects, a lawnmower and one or more accessories may be removably coupled, allowing for customization and versatility in carrying out diverse tasks using the multi-utility modular device 100.

Figure 15A:
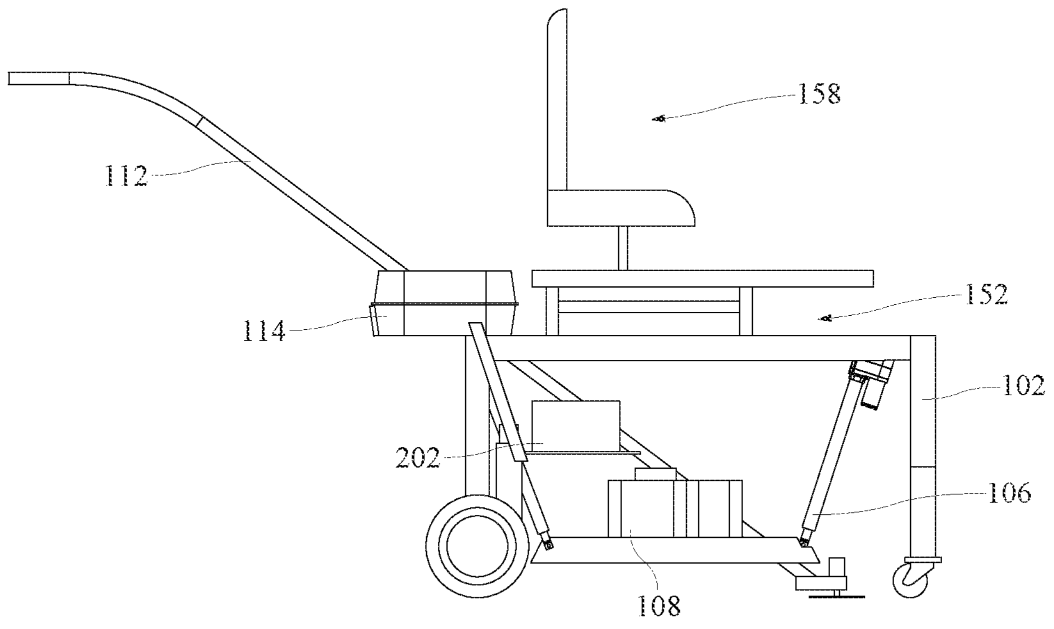
FIGS. 15A, 15B and 15C show exemplary configurations of a lifting table removably coupled on the top of the base chassis of the multi-utility modular device, in accordance with some embodiments of the present disclosure.
Figure 15B:
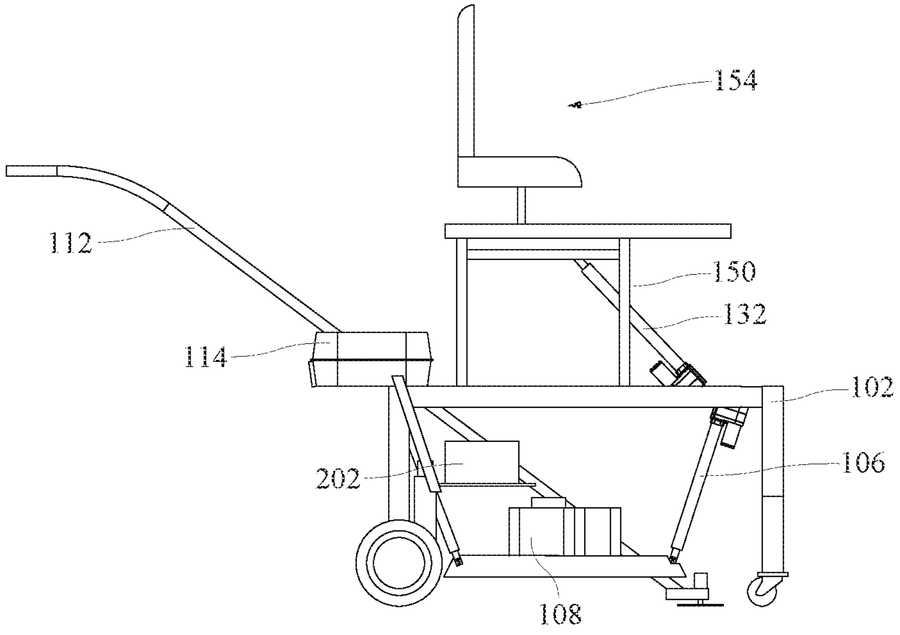
Figure 15C:
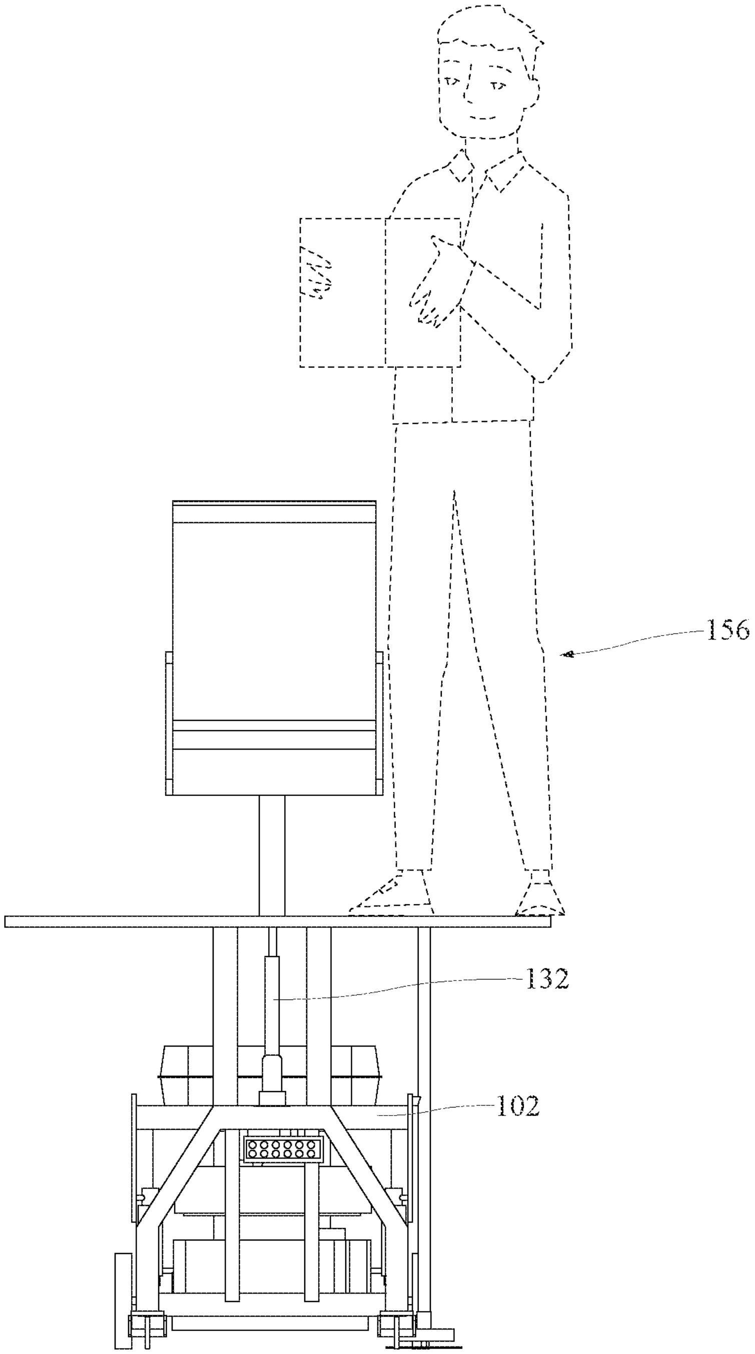
Figure 16:
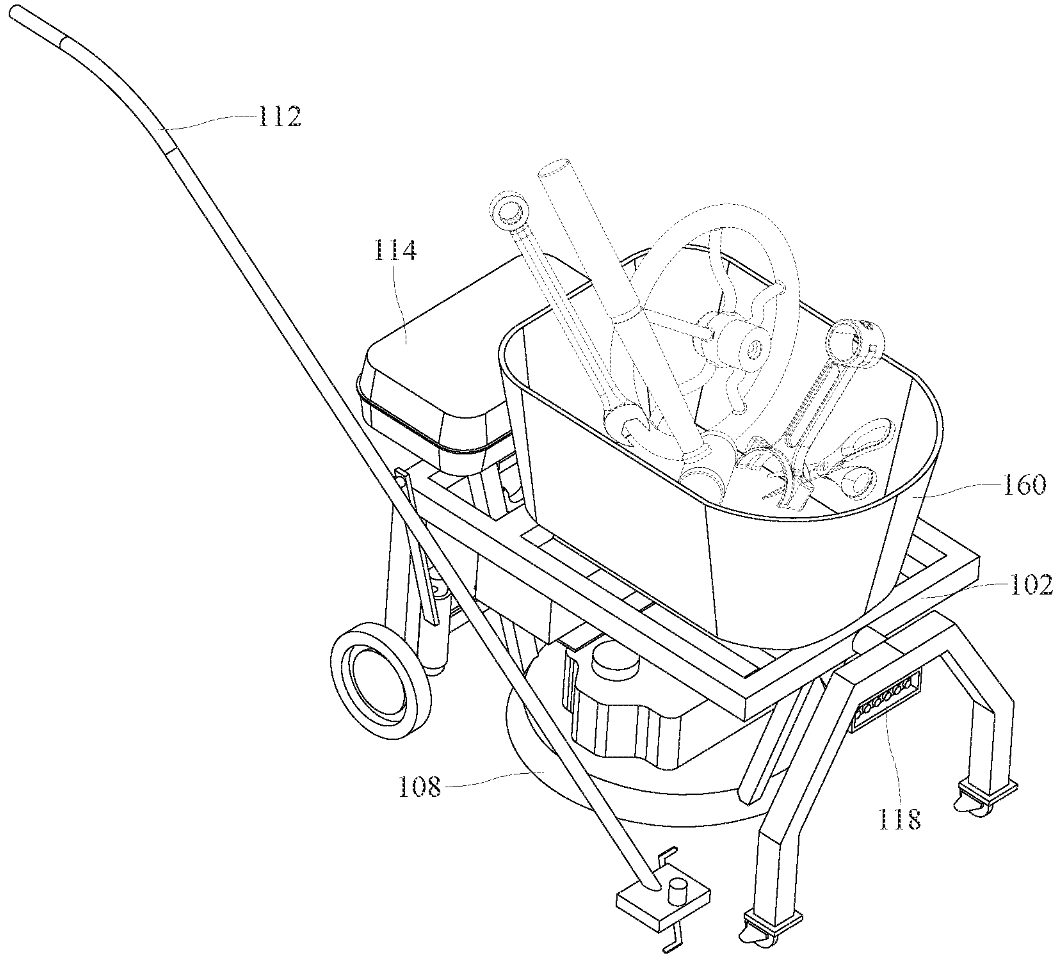
FIG. 16 shows an exemplary heavy load cart removably coupled on the top of the base chassis of the multi-utility modular device, in accordance with some embodiments of the present disclosure.

The base chassis 102 may comprise one or more wheels 116 (also referred to as wheels 304 and 306 shown in FIGS. 3A, 3B and 3C respectively) for enabling smooth movement of the multi-utility modular device 100 on uneven ground. Further, the base chassis 102 comprises a first attachment, comprising at least one first adjustable extension arm (referred to as 132, shown in FIG. 13 and FIG. 15), configured to allow removable coupling of one or more objects 104 on the top of the base chassis 102. The one or more objects 104 comprise a dump-bed, a cart (also be referred to as lifting cart 160 as shown in FIG. 16), a lifting table (also be referred to as lifting table 150 as shown in FIGS. 15A-15C), a seating arrangement (also be referred to as seating arrangement 158, shown in FIG. 15A), a tool-box, work-stations, or planters. The base chassis 102 may also serve as a platform for integrating advanced features like motorized propulsion, remote control functionality, camera integration, and intelligent sensors, further augmenting the capabilities of the multi-utility modular device 100.

The configuration of the multi-utility modular device 100 may allow users to select an appropriate object from the one or more objects 104 as per the requirement in order to meet the unique demands of different projects and applications. The removable coupling of the one or more objects 104 on the top of the base chassis 102 may provide a wide range of functionalities, thus transforming the basic wheelbarrow design into the multi-utility modular device 100 tailored to specific tasks in various industries and settings. Further, the first attachment may comprise at least one first mounting bracket affixed to the base chassis 102. Also, the at least one first adjustable extension arm may be configured to allow upward and downward vertical movement of the one or more objects 104 removably coupled on the top of the base chassis 102.

Figure 13:
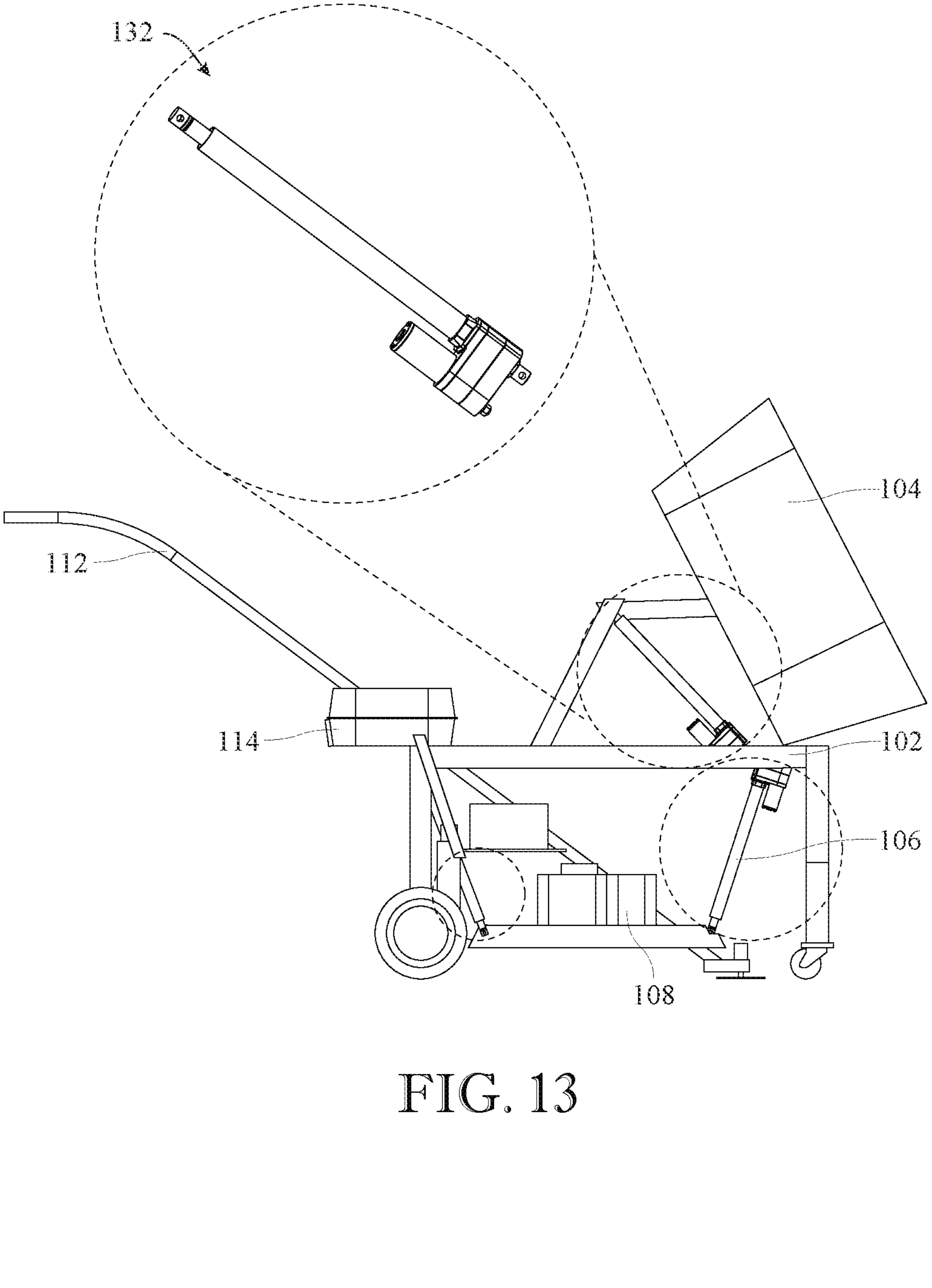
FIG. 13 shows an exemplary configuration of at least one first adjustable extension arm of the multi-utility modular device, in accordance with some embodiments of the present disclosure.

One such object from the one or more objects 104 may be the dump bed removably coupled to the top of the base chassis 102, offering ample space for carrying loose materials such as soil, gravel, or construction debris. Further, the multi-utility modular device 100 may comprise an ability to tilt and unload the contents of the dump bed by using the at least one first adjustable extension arm (as shown in FIG. 13). The dump bed may streamline material transport and may simplify loading and unloading process, thus making the multi-utility modular device 100 ideal for construction, landscaping, and gardening tasks. Further, another object from the one or more objects 104 may be the cart that may carry larger, bulky loads. The cart may be used for transporting tools, equipment, or supplies, in commercial, industrial, or household settings.

In addition, the lifting table (as shown in detail in FIGS. 15B and 15C) may also be removable coupled on the top of the base chassis 102. The lifting table may be designed to elevate platform, heavy objects, or materials to a convenient working height. By providing a stable and adjustable surface, the lifting table may facilitate efficient tasks such as planting, pruning, or construction work, while minimizing strain on the back and joints of a user. Moreover, a seating arrangement (as shown in detail in FIG. 15A) may also be removably coupled on the top of the base chassis 102 to provide an elevated working platform. The seating arrangement may comprise a chair, a foldable seat, or a stool, thus transforming the modular device 100 into a mobile workstation. The seating arrangement may also provide a comfortable spot for rest or work breaks while on the job, improving overall productivity and user comfort.

Further, the one or more objects 104 may be the tool-box for a dedicated storage solution for hand tools, hardware, or small equipment. Various compartments in the tool-box may keep essential items organized and easily accessible, preventing time wasted searching for tools during tasks. Also, the one or more objects 104 may be the workstation to create a convenient workspace directly on the modular device 100. The workstation may include built-in tool holders, trays, and dividers, enhancing efficiency during tasks that require multiple tools or equipment. Moreover, the planters may also be removably coupled on the top of the base chassis 102 to allow users to cultivate plants or flowers while on the move. The planters may be particularly useful in gardening and landscaping applications, providing the ability to plant or transport small vegetation with ease.

The base chassis 102 comprises a second attachment, comprising at least one second adjustable extension arm 106 with a drop-design structure, configured to allow removable coupling of a lawnmower 108 (may also be referred to as lawnmowers 502 and 504, shown in FIGS. SA and SB) on the bottom of the base chassis 102 under the one or more objects 104. The second attachment may comprise at least one second mounting bracket affixed to the base chassis 102. The at least one second adjustable extension arm 106 may be configured to allow upward and downward vertical movement of the lawnmower 108 removably coupled on the bottom of the base chassis 102.

Removable coupling of the lawnmower 108 under the one or more objects 104 may further enhance the capability of the multi-utility modular device 100 along with optimizing efficiency and space. The users may effortlessly switch between mowing and collecting grass clippings while having the added advantage of using the multi-utility modular device 100 for other tasks such as transporting gardening tools, soil, or plants. The lawnmower 108 coupled at the bottom of the base chassis 102 of the multi-utility modular device 100 may add a new dimension of functionality, making the multi-utility modular device 100 an all-in-one solution for landscaping and gardening tasks.

According to some embodiments of the present disclosure, the lawnmower 108 may be of one or more types based on lawn sizes, terrain conditions, and user preferences, further exemplifying the adaptability and practicality of the multi-utility modular device 100 in various landscaping scenarios. For instance, a manual push reel mower may be coupled to the bottom of the base chassis 102 to provide an eco-friendly and low-maintenance mowing experience. In other aspects, a gas-powered rotary mower may be coupled to the bottom of the base chassis 102 for larger lawns and challenging terrains. Further, an electric corded mower may also be coupled to the bottom of the base chassis 102. Moreover, a battery-powered mower may also be coupled to the bottom of the base chassis 102 for a cordless operation.

The base chassis 102 further comprises a third attachment 110 (also shown in detail in FIG. 10) configured to allow removable coupling of one or more accessories 112 on at least one side of the base chassis 102. The one or more accessories 112 comprise a weed-eater or a leaf blower. The weed-cater may be implemented as a weed-cater 802, shown in FIG. 8. The leaf blower may be implemented as a leaf blower 902, shown in FIG. 9. The third attachment 110 may comprise at least one third mounting bracket to be affixed to least one side of the base chassis 102 of the multi-utility modular device 100. The at least one third mounting bracket may be a quick-release mounting bracket.

The third attachment 110 comprising the at least one third mounting bracket may further comprise a locking mechanism to ensure stable and reliable connection of the one or more accessories 112 to the base chassis 102. The weed-eater employed as the one or more accessories 112 may provide users the convenience of trimming grass and weeds in tight or hard-to-reach areas, such as along fences or pathways. The leaf blower employed as the one or more accessories 112 may enable users to clear debris and fallen leaves with ease. Moreover, the removable coupling of the one or more accessories 112 may allow users to effortlessly attach or detach the one or more accessories 112 to the base chassis 102, thus offering the flexibility to customize the multi-utility modular device 100 based on specific tasks at hand. The multi-utility modular device 100 may be easily transformed into a lawn maintenance powerhouse or a versatile material transport tool, adapting to different needs and demands.

Furthermore, a weather proof protective case 114 (also shown in FIG. 6) may be removably coupled on the rear side of the multi-utility modular device 100. The weather proof protective case 114 may comprise an internal electric circuit (may be implemented as 702, shown in FIG. 7). The internal electric circuit may be meticulously designed to be safely enclosed within the weather proof protective case 114 for protecting the delicate electronic components from moisture, dust, and debris.

The electrical components incorporated within the internal electric circuit of the weather proof protective case 114 may vary depending on the intended application of the multi-utility modular device 100. The internal electric circuit may comprise power outlets, allowing users to conveniently charge or power the electronic devices and tools directly from the modular device 100. Advanced sensors, such as moisture sensors or temperature sensors, may also be connected to the internal electric circuit to monitor environmental conditions or material properties. The internal electric circuit may further comprise remote control capabilities and GPS (global positioning system) technology.

In addition, an integrated control panel with a user-friendly interface may be provided on the exterior of the weather proof protective case 114 to allow users to adjust lighting settings, power on/off the attached one or more accessories 112, or monitor battery levels.

Further, an LED headlight 118 (also shown in detail in FIG. 4) may be removably coupled on the front side of the base chassis 102 of the multi-utility modular device 100 to provide improved visibility during low-light conditions or night-time tasks. Moreover, the users may optimize the performance of the multi-utility modular device 100 across different terrains and tasks by employing various types of wheels 116. The ability to adapt the wheels 116 of the multi-utility modular device 100 according to the specific need of each job may contribute to improved productivity. Various types of wheels 116 may be employed to the multi-utility modular device 100, such as, but not limited to, bolt and axle wheels, threaded tracks, or tractor teeth wheels. In addition, pneumatic wheels, solid rubber wheels, semi-pneumatic wheels, knobby tread wheels, or all-terrain wheels may also be employed. The wheels 116 may be easily removed and swapped by using a user-friendly locking and fastening system.

Figure 2:
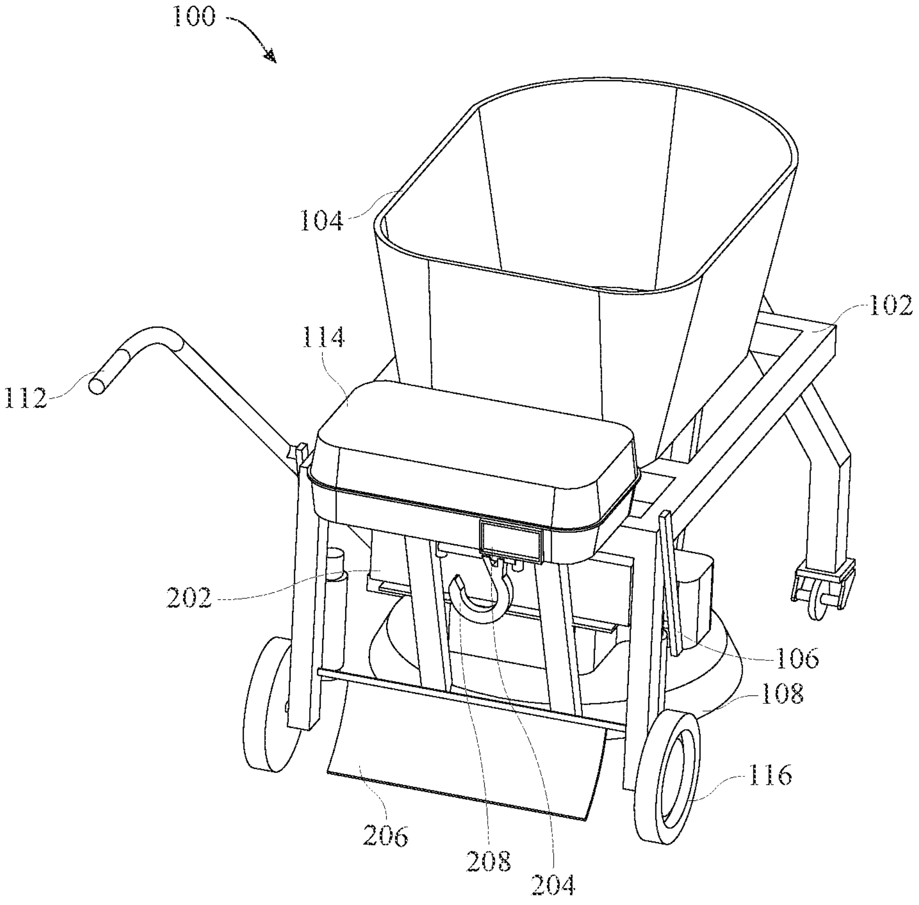
FIG. 2 shows an exemplary rear view of the multi-utility modular device, in accordance with some embodiments of the present disclosure.

FIG. 2 shows an exemplary rear view of the multi-utility modular device 100, in accordance with some embodiments of the present disclosure. The multi-utility modular device 100 may comprise a battery 202 (also shown in detail in FIG. 12A), a smart battery monitor 204 (also shown in detail in FIG. 11), a tiller/cultivator/snowblade 206 (also shown in detail in FIG. 14) and a hook 208 (also shown in detail in FIG. 11).

The battery 202 may provide power supply to the multi-utility modular device 100. The battery-powered system may eliminate the need for manual effort or electric outlets. The battery 202 may be a rechargeable lithium-ion battery, lead-acid battery, or any other type of battery providing high energy density, reliability, and long lifespan. Further, the battery 202 may be removably coupled to the base chassis 102 using one or more attachments. The battery 202 may provide power to drive the wheels, eliminating the need for manual pushing. Moreover, the battery 202 may also power the LED headlight 118, providing bright illumination for night-time or low-light tasks. The battery 202 may also supply power to the integrated control panel, allowing users to access and adjust various settings, monitor battery levels, and control the LED headlight 118 or other electric tools.

According to some embodiments of the invention of the present disclosure, the multi-utility modular device 100 may comprise a remote-control functionality for remote operation and control of movement of the multi-utility modular device 100. The remote-control operation may be enabled by the battery 202 for seamless communication between a remote-control device and the components of the multi-utility modular device 100, providing convenient operation from a distance.

In addition, a battery charger may be provided to charge the battery 202 of the multi-utility modular device 100, thus ensuring reliable and efficient power supply to the multi-utility modular device 100. The smart battery monitor 204 may indicate one or more of battery health, temperature, and remaining power of the battery 202 of the multi-utility modular device 100. The smart battery monitor 204 may be equipped with advanced sensors and intelligent circuitry, providing real-time data on several crucial parameters. The battery health may be determined by measuring factors such as charging cycles, voltage levels, and internal resistance. The battery health data may allow the users to gauge the overall condition of the battery 202.

Further, the battery temperature may be continuously monitored for safety and performance optimization. The smart battery monitor 204 may constantly measure the battery temperature, ensuring the temperature remains within safe operating limits. In extreme conditions, such as high ambient temperatures or heavy use, the smart battery monitor 204 may also alert the users if the battery 202 is at risk of overheating. The smart battery monitor 204 may accurately display the remaining power level of the battery 202, providing users with real-time information on how much charge is available. Additionally, the smart battery monitor may estimate the runtime of the battery 202 based on the current load and usage patterns.

The smart battery monitor 204 may also comprise a control panel or a display unit to allow the users to access and control the information related to the battery 202. The display unit may comprise a user-friendly interface with intuitive graphics and icons, for users to interpret the data without technical expertise. The smart battery monitor 204 may also support wireless connectivity, enabling users to access information related to the battery 202 remotely through a smartphone app or web interface.

Furthermore, the tiller/cultivator/snowblade 206 at the rear of the multi-utility modular device 100 may add a versatile and transformative functionality, rendering the multi-utility modular device 100 as an indispensable tool for gardening, landscaping, and snow removal tasks. The tiller/cultivator 206 may comprise rotating blades to penetrate the soil, to break the soil, or to prepare the soil for planting or landscaping. The tiller/cultivator/snowblade 206 may also work as a robust snow removal tool to clear driveways, pathways, or sidewalks effortlessly. The rear-mounted design of the tiller/cultivator/snowblade 206 may further ensure that the front end of the multi-utility modular device 100 remains unobstructed, allowing users to navigate easily in both forward and reverse directions.

Moreover, the hook 208 may further add to the versatility of the functions of the multi-utility modular device 100. The hook 208 may securely hold various items without interfering with the balance or maneuverability of the multi-utility modular device 100. The hook 208 may offer a convenient spot to hang or store various tools and bags. The rear-mounted hook 208 may be a simple yet ingenious addition to the multi-utility modular device 100. The hook 208 may complement the primary functions of the multi-utility modular device 100, enabling the users to optimize the outdoor tasks by having essential tools and accessories readily available.

Figure 3A:
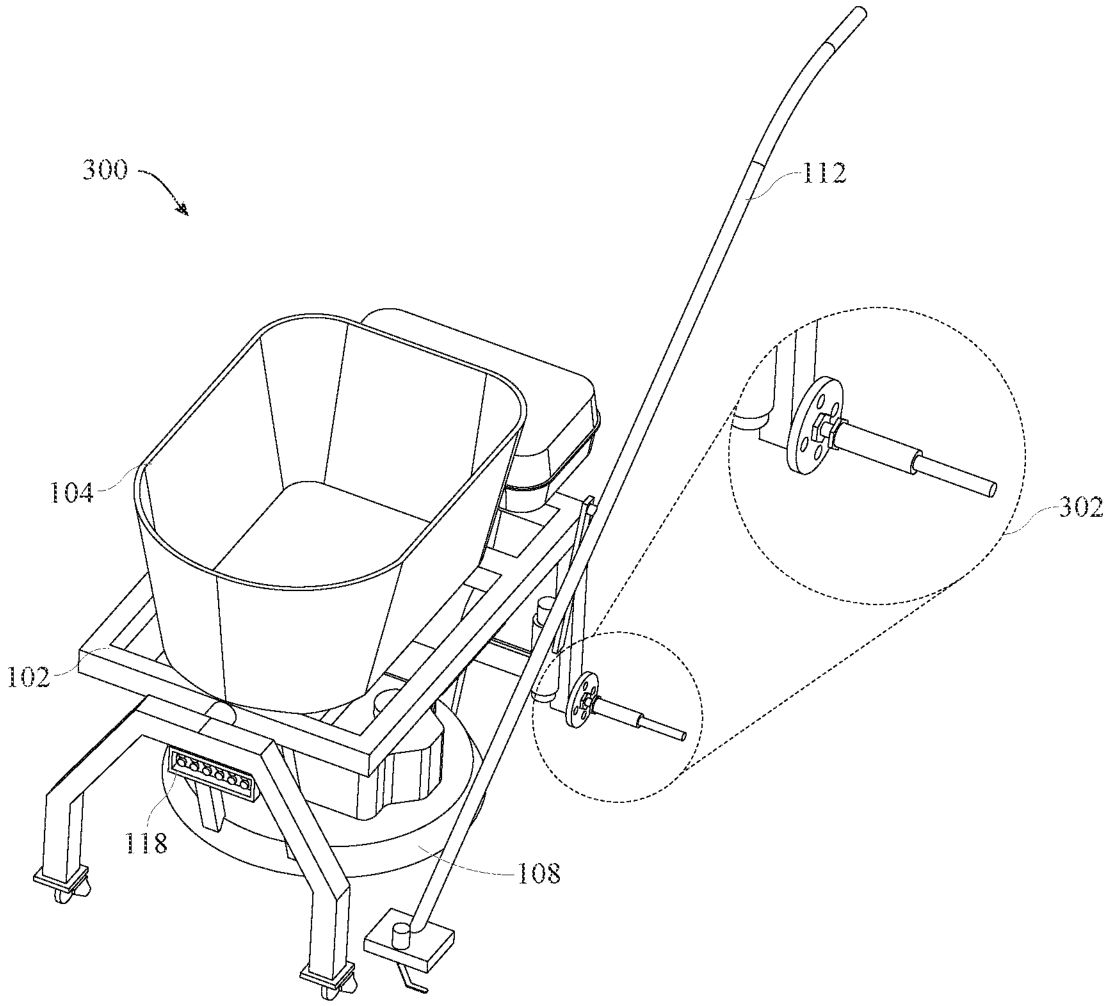
FIGS. 3A, 3B and 3C show exemplary track wheel variations of the multi-utility modular device, in accordance with some embodiments of the present disclosure.
Figure 3B:
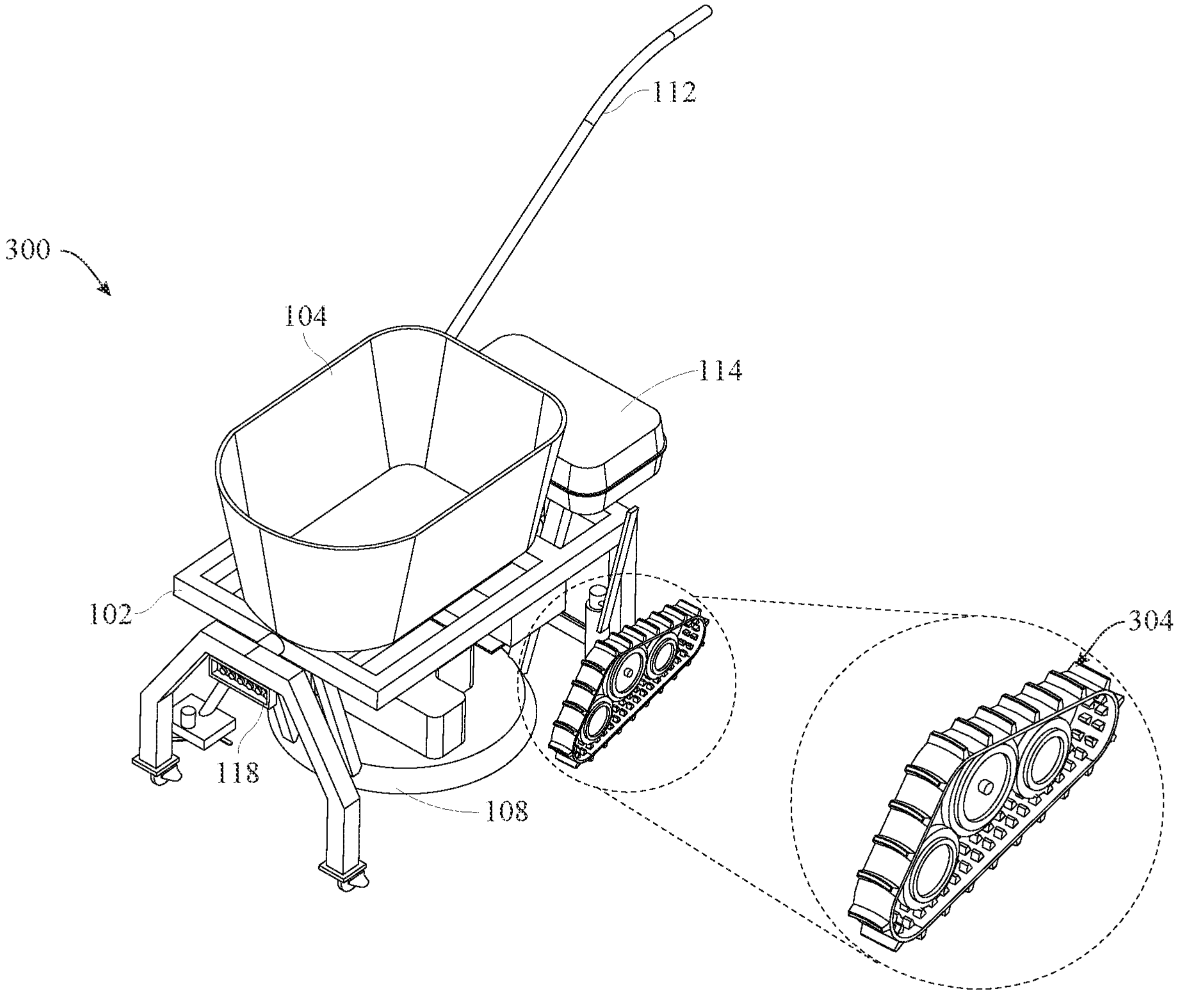
Figure 3C:
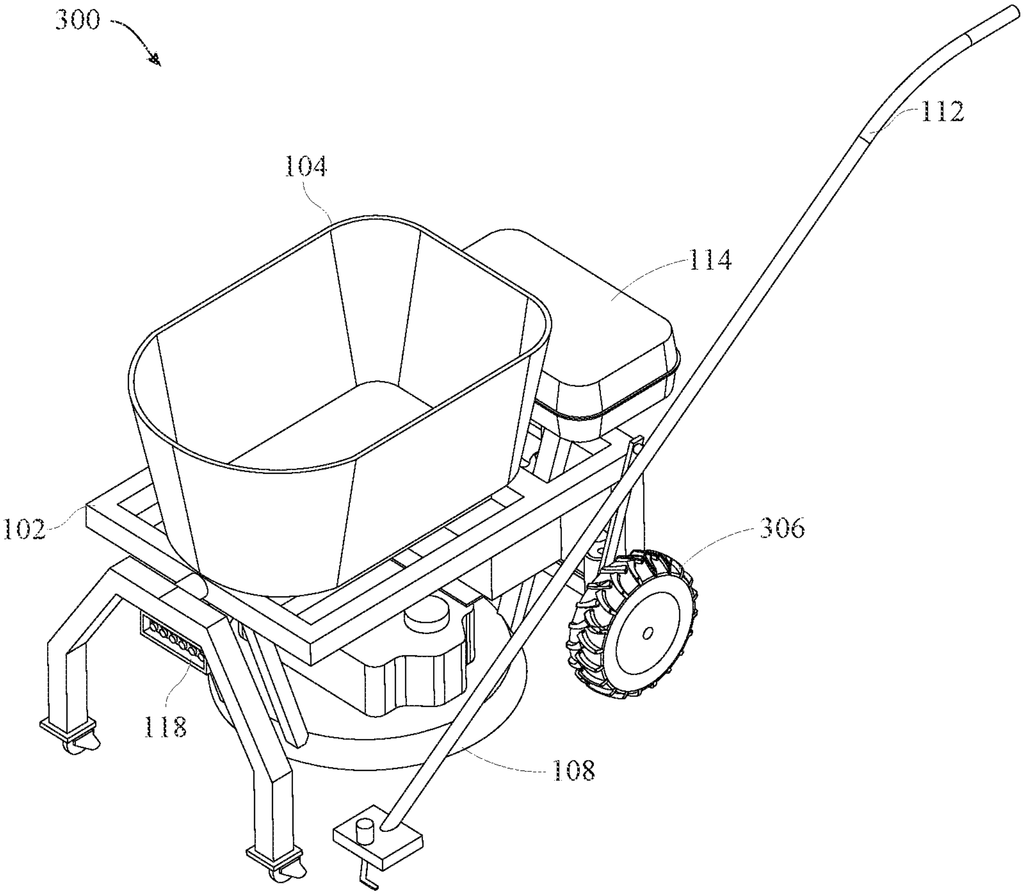

FIGS. 3A, 3B and 3C show exemplary track wheel variations 300 of the multi-utility modular device 100, in accordance with some embodiments of the invention of the present disclosure. One or more variations of wheels may be employed to provide a versatile and reliable solution for different requirements and applications of the multi-utility modular device 100. The wheels may be changeable, ensuring smooth and easy maneuver of the modular device 100 across different terrains and tasks. Various type of wheels may be coupled to the modular device 100, such as, but not limited to, bolt and axle wheels, threaded tracks, or tractor teeth wheels.

FIG. 3A shows an exemplary bolt, wheel, and axle assembly 302 for effortless movement and load-carrying capabilities of the multi-utility modular device 100. The bolt may serve as the central shaft that connects the wheel to the axle. The wheel may vary in size and material based on the intended application of the multi-utility modular device 100. The bolt, wheel, and axle assembly 302 may reduce the effort required to lift and maneuver heavy loads, making the multi-utility modular device 100 more user-friendly and efficient.

FIG. 3B shows exemplary threaded tracks 304 that may be suitable for uneven and rough terrains. The threaded tracks 304, also known as threaded wheels or caterpillar tracks, may enhance traction and maneuverability in challenging terrains. The large tread pattern may render the threaded tracks 304 suitable for uneven or slippery terrains, such as mud, snow, sand, or steep inclines, where regular wheels may struggle. The threaded tracks 304 may enhance traction, stability, and maneuverability of the multi-utility modular device 100, thus enabling the multi-utility modular device 100 to operate in challenging or rugged environments.

FIG. 3C shows an exemplary tractor teeth wheel variation 306, optimized for maximum traction and performance in challenging terrains. The toothed protrusions or spikes on the tractor teeth wheel 306 may provide enhanced grip and self-cleaning capabilities. The tractor teeth wheel 306, also known as a spiky or toothed wheel, may incorporate tooth-like protrusions or spikes around the circumference. The tractor teeth wheel 306 may be employed when the multi-utility modular device 100 is required to operate in heavy-duty applications, such as agriculture, construction, forestry operations, or off-roading. The tractor teeth wheel may also be useful in muddy, sandy, or snow-covered terrains, allowing the multi-utility modular device 100 to move smoothly without slipping.

The bolt, wheel, and axle assembly 302, the threaded tracks 304, and the tractor teeth wheel 306 are similar in configuration and functioning to the wheels 116, as described above in detail in relation to FIG. 1. The information is not repeated herein for the sake of brevity.

Figure 4:
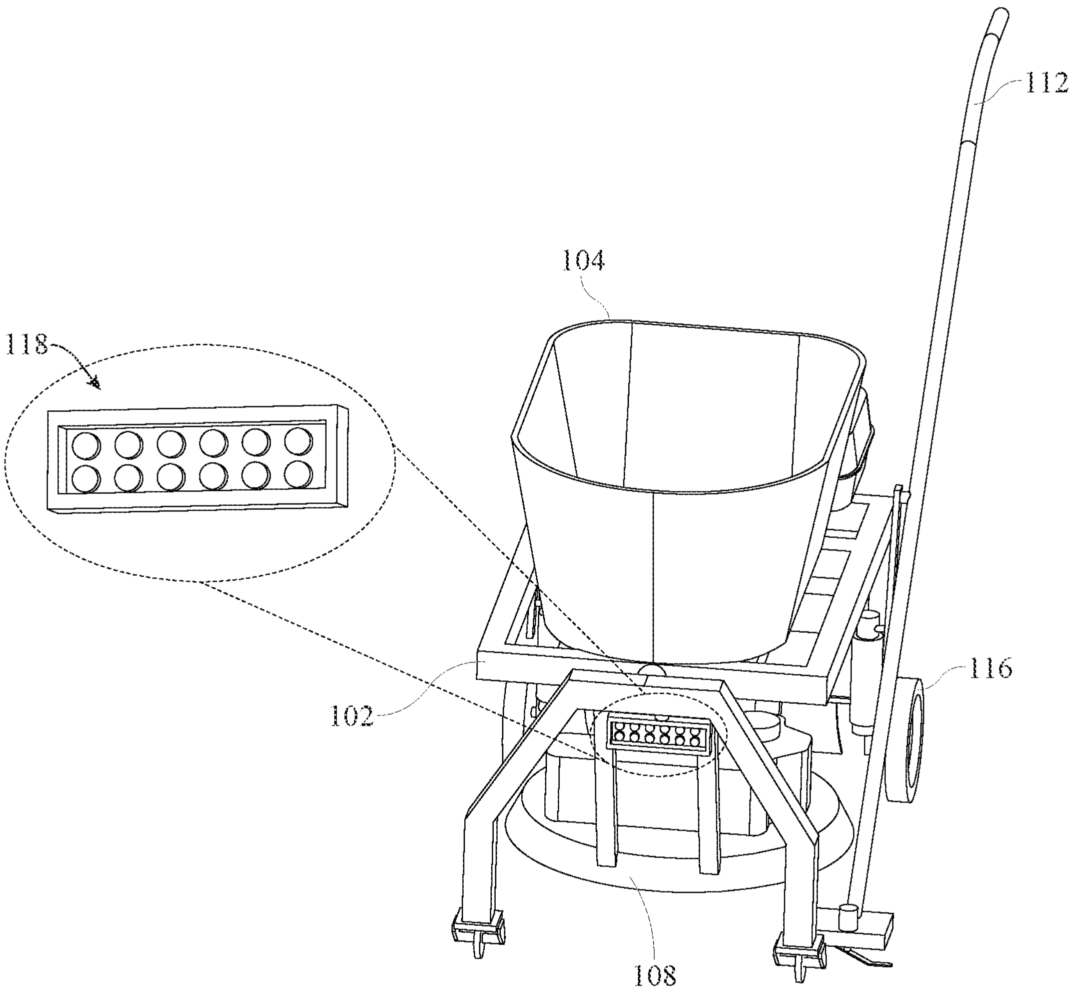
FIG. 4 shows an exemplary LED headlight mounted on the front side of the base chassis of the multi-utility modular device, in accordance with some embodiments of the present disclosure.

FIG. 4 shows the LED headlight 118 mounted on the front side of the base chassis 102 of the multi-utility modular device 100, in accordance with some embodiments of the present disclosure. The LED headlight 118 may enhance visibility and safety during various outdoor tasks, especially in low-light conditions or at night. The LED headlight 118 may be energy-efficient, consuming minimal power while providing bright illumination. The LED headlight 118 may have a long lifespan and may require minimal maintenance or replacement compared to the traditional light sources, thus reducing operating costs. The functioning of the LED headlight 118 is provided in detail in relation to FIG. 1. The information is not repeated herein for the sake of brevity.

Figure 5A:
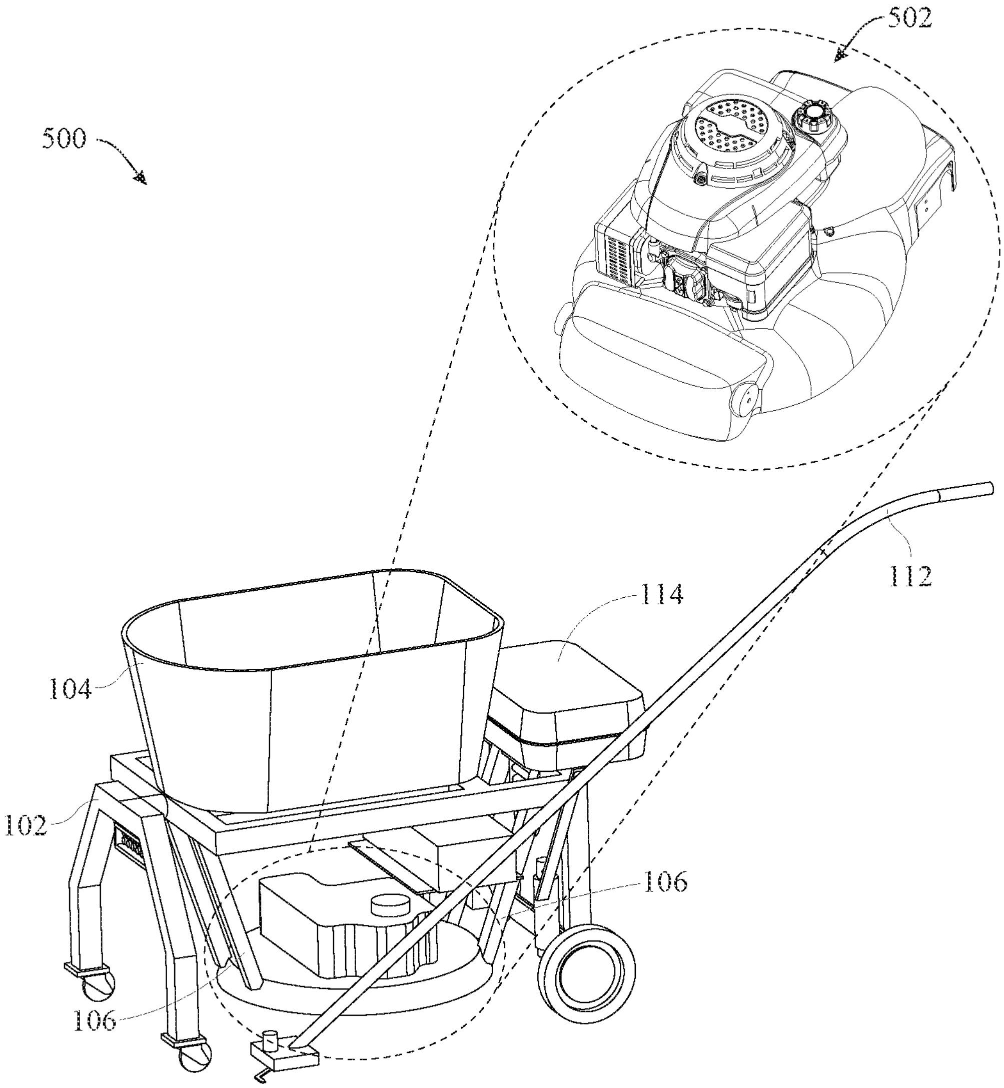
FIGS. 5A and 5B show exemplary variations of lawnmowers removably coupled on the bottom of the base chassis of the multi-utility modular device, in accordance with some embodiments of the present disclosure.
Figure 5B:
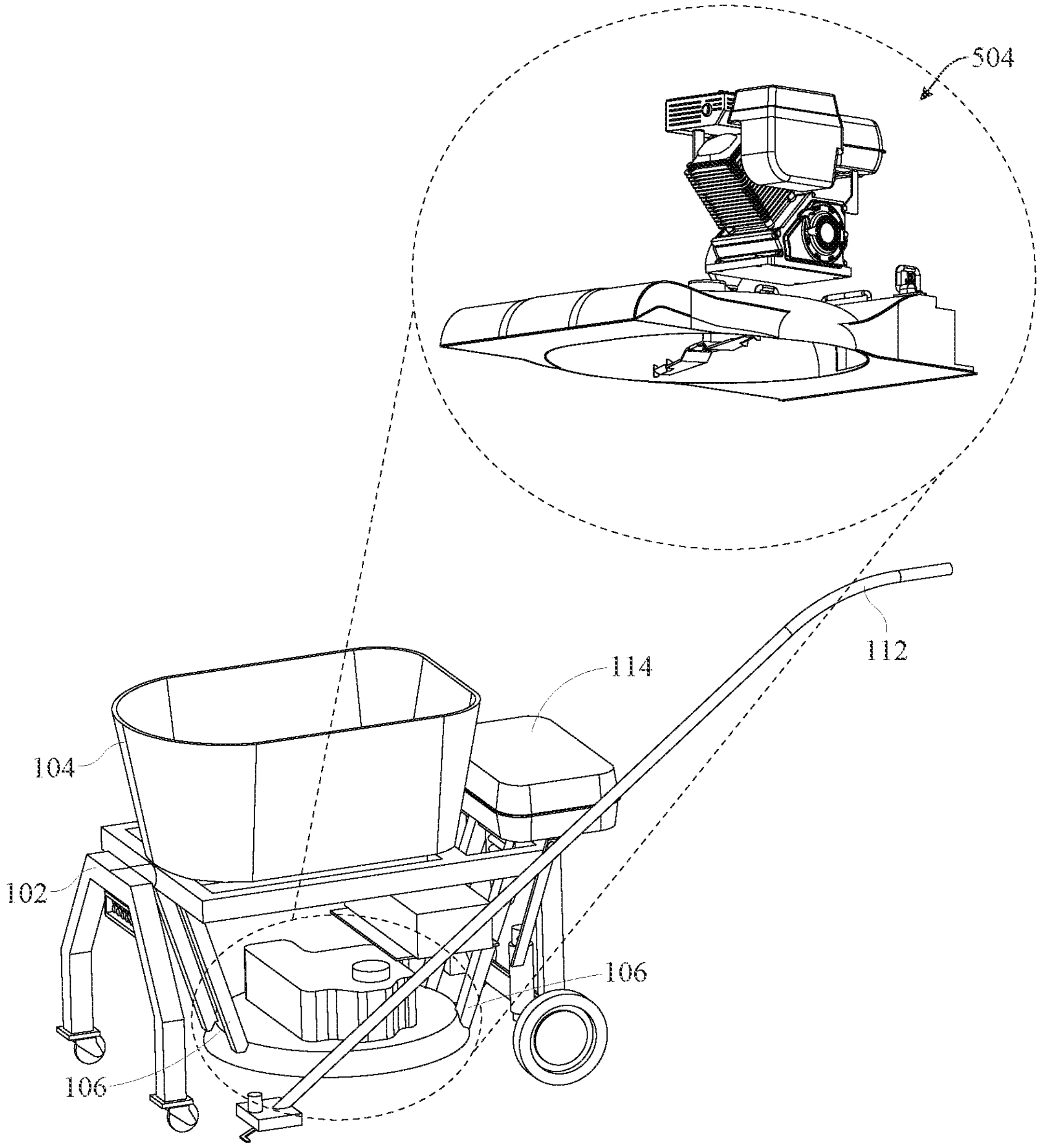

FIGS. 5A and 5B show exemplary lawnmower variations 500, removably coupled on the bottom of the base chassis 102 of the multi-utility modular device 100, in accordance with some embodiments of the present disclosure. FIG. 5A shows an exemplary lawnmower 502 removably coupled on the bottom of the base chassis 102 of the multi-utility modular device 100 by using the at least one second adjustable extension arm 106 with the drop-design structure. The base chassis 102 comprises the second attachment (also described above in detail in relation to FIG. 1). The second attachment may further comprise the at least one second mounting bracket to attach the at least one second adjustable extension arm 106 with the drop-design structure. The at least one second adjustable extension arm 106 may be configured to allow removable coupling of the lawnmower 502 on the bottom of the base chassis 102 under the one or more objects 104 (provided above in detail in relation to FIG. 1).

FIG. 5B shows another exemplary lawnmower 504 removably coupled on the bottom of the base chassis 102 of the multi-utility modular device 100. The lawnmowers 502 and 504 may be used for cutting and maintaining grass in lawns, gardens, parks, and other green spaces. The lawnmowers 502 and 504 may be gas-powered with internal combustion engines running on gasoline, electric powered, battery powered, or riding mowers. In addition, the lawnmowers 502 and 504 may be self-propelled mowers having a drive system that moves the mowers forward, reducing the physical effort required by the user during mowing.

Further, the at least one second adjustable extension arm 106 may be configured to allow upward and downward vertical movement of the lawnmowers 502 and 504, thus offering adjustable cutting heights, allowing users to choose the desired grass height. The lawnmowers 502 and 504 may also comprise built-in grass collection bags or bins to collect the clippings. The lawnmowers 502 and 504 may also have a mulching function, where the clippings are finely chopped and left on the lawn as natural fertilizer.

Figure 6:
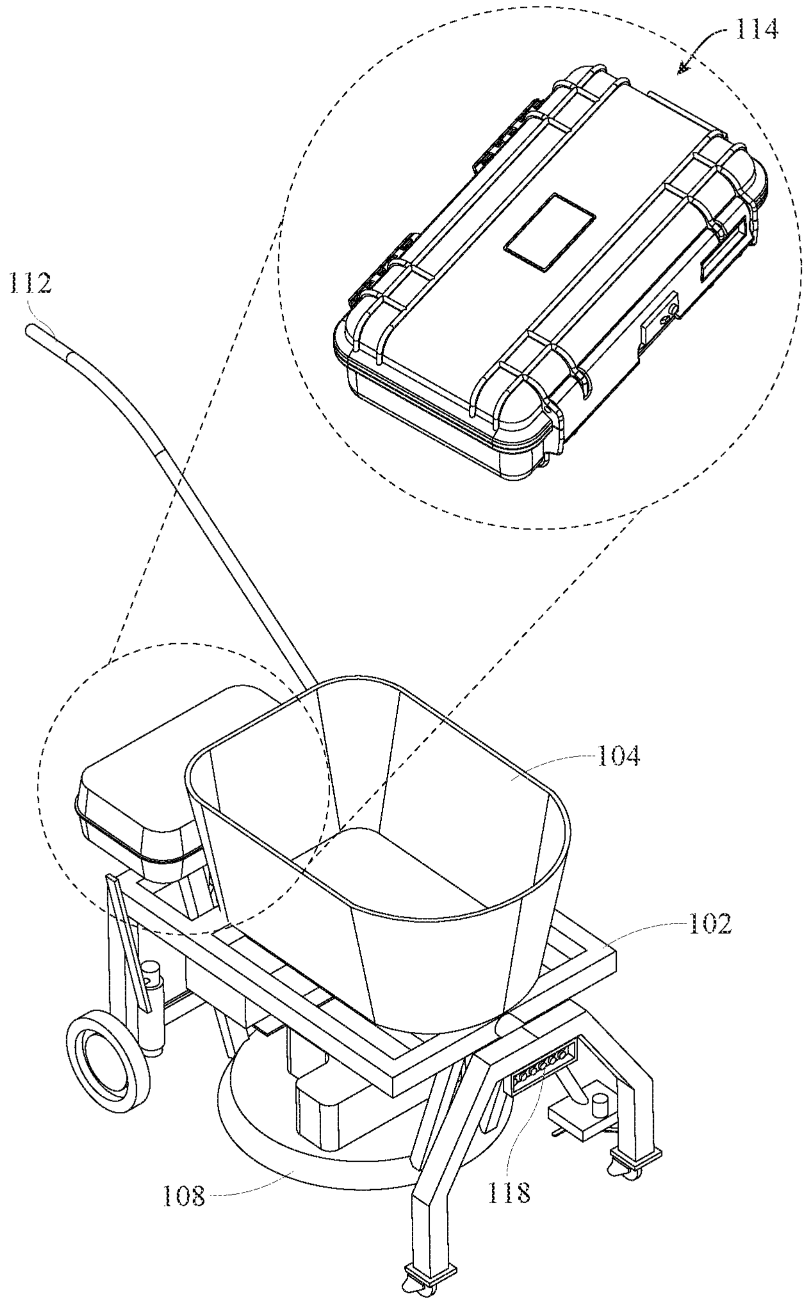
FIG. 6 shows an exemplary configuration of a weather proof protective case mounted on the rear side of the multi-utility modular device, in accordance with some embodiments of the present disclosure.
Figure 7:
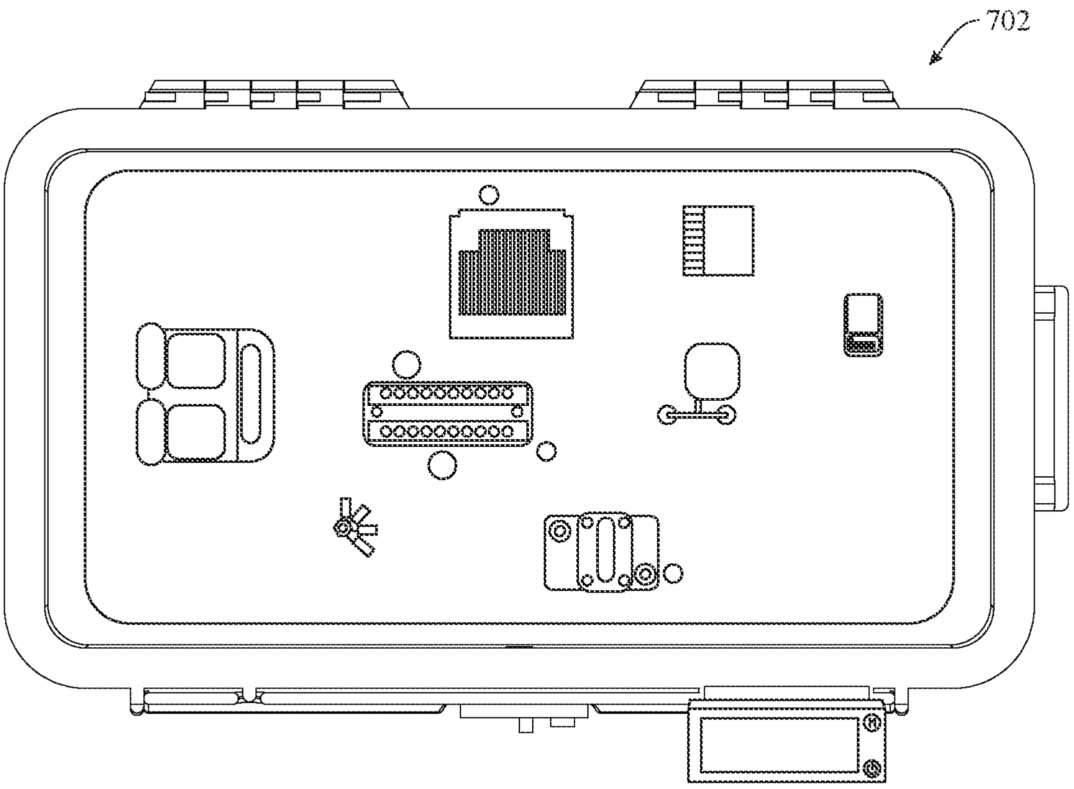
FIG. 7 shows an exemplary configuration of an internal electric circuit in the weather proof protective case, in accordance with some embodiments of the present disclosure.

FIG. 6 shows an exemplary configuration of the weather proof protective case 114 mounted on the rear side of the multi-utility modular device 100, in accordance with some embodiments of the present disclosure. The weather proof protective case 114 may also comprise an internal electric circuit 702 as shown in FIG. 7. The internal electric circuit 702 may be meticulously designed to be safely enclosed within the weather proof protective case 114 for protecting the delicate electronic components from external environmental elements like moisture, dust, and debris. The electrical components incorporated within the internal electric circuit 702 may vary depending on the intended application of the multi-utility modular device 100.

Further details related to the weather proof protective case 114 and the internal electric circuit 702 are provided above in relation to FIG. 1.

Figure 8:
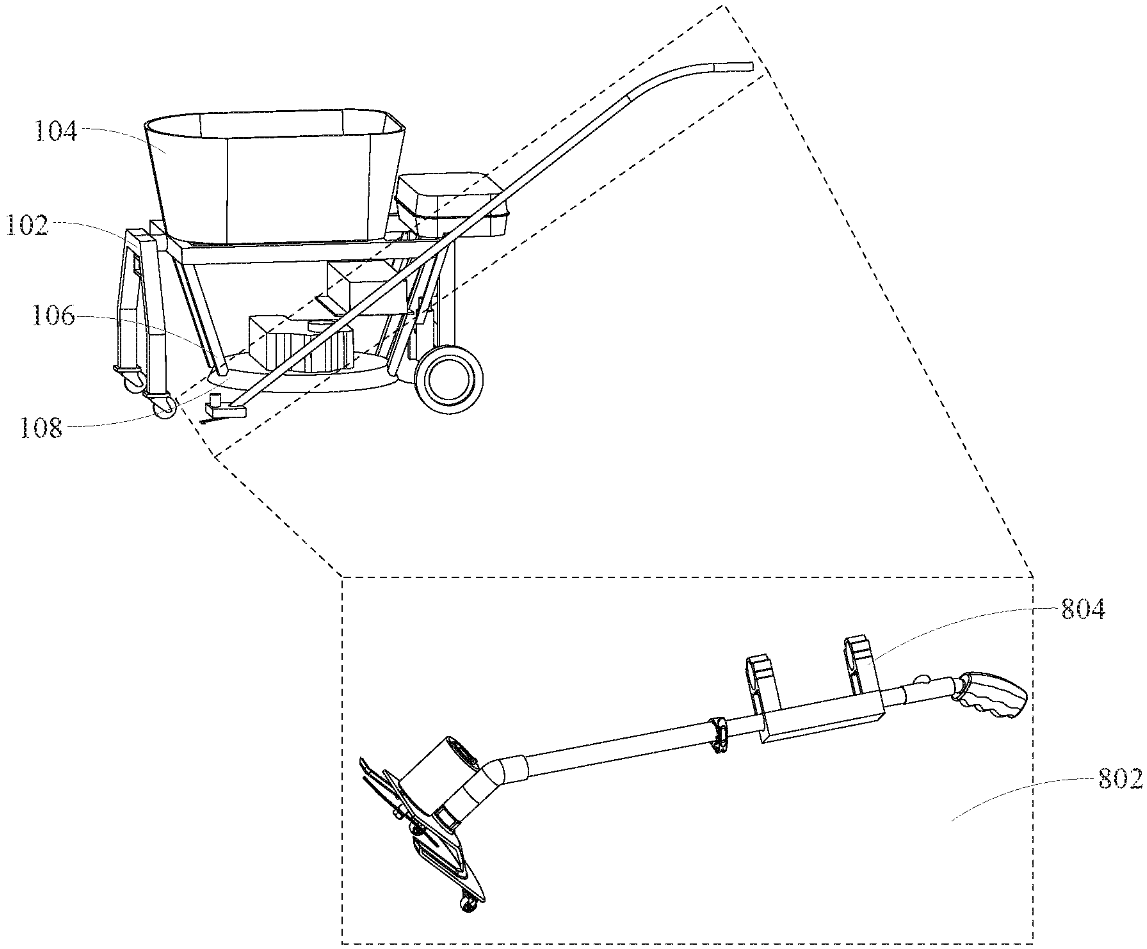
FIG. 8 shows an exemplary configuration of a weed-eater removably coupled on at least one side of the base chassis of the multi-utility modular device, in accordance with some embodiments of the present disclosure.

FIG. 8 shows an exemplary configuration of a weed-eater 802 removably coupled on at least one side of the base chassis 102 of the multi-utility modular device 100, in accordance with some embodiments of the present disclosure. The base chassis 102 comprises the third attachment 110. The third attachment 110 may comprise at least one third mounting bracket 804. The mounting bracket 804 may be a quick-release mounting bracket enabling easy snap-fit coupling of the weed-eater 802 to the base chassis 102. The mounting bracket 804 may be strategically positioned on at least one side of the base chassis 102, providing a secure and flexible coupling mechanism for various accessories, like the weed-eater 802. By incorporating the weed-eater 802 into the multi-utility modular device 100, users may efficiently perform lawn maintenance remotely and effortlessly. The mounting bracket 804 may allow removable coupling of the weed-eater 802 to effortlessly attach the weed-eater 802 when required for specific tasks and remove the weed-eater 802 when not in use.

Figure 9:
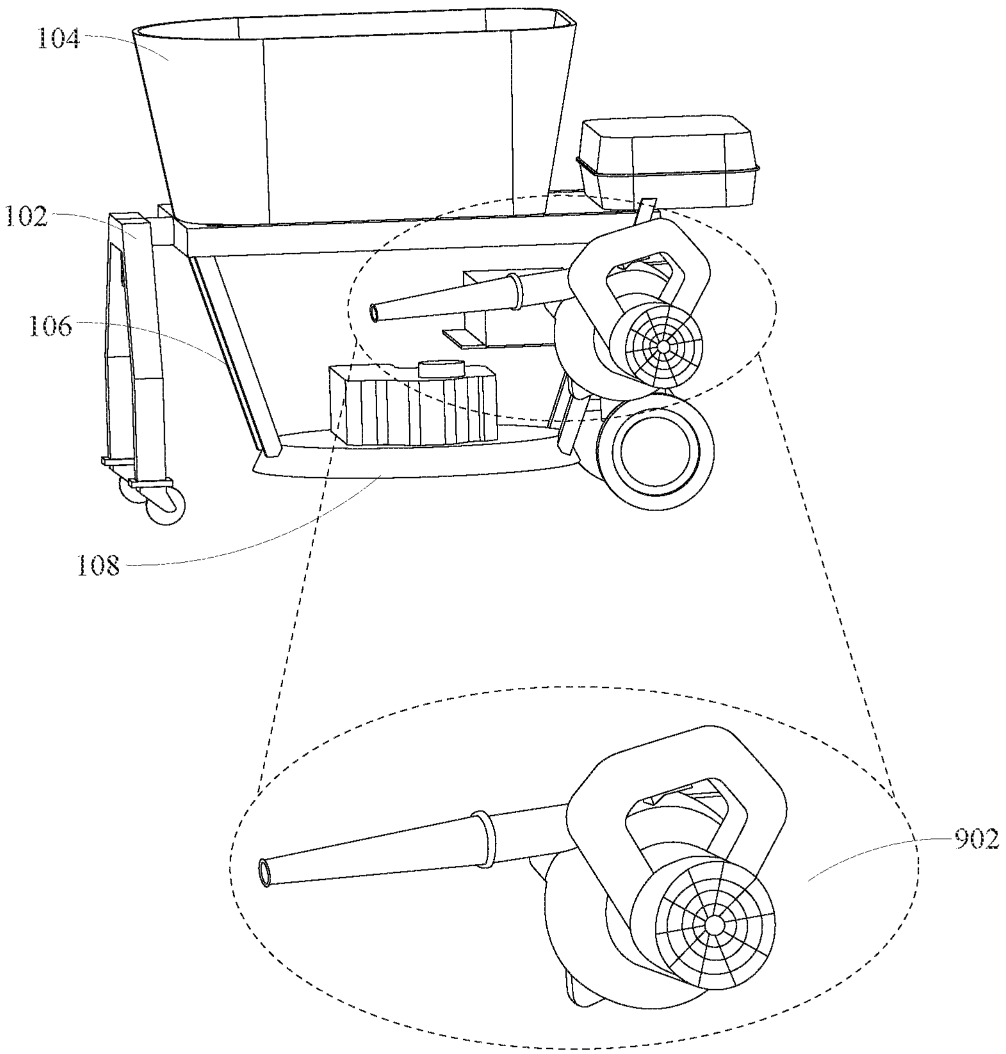
FIG. 9 shows an exemplary configuration of a leaf blower removably coupled on at least one side of the base chassis of the multi-utility modular device, in accordance with some embodiments of the present disclosure.

FIG. 9 shows an exemplary configuration of a leaf blower 902 removably coupled on at least one side of the base chassis 102 of the multi-utility modular device 100, in accordance with some embodiments of the present disclosure. The base chassis 102 comprises the third attachment 110. The third attachment 110 may comprise the at least one third mounting bracket. The mounting bracket may be implemented as the mounting bracket 804, as shown in FIG. 8. The mounting bracket may allow removable coupling of the leaf blower 902 to the base chassis 102, enabling the users to effortlessly attach the leaf blower 902 when required for specific tasks and detach the leaf blower 902 when not in use.

Figure 10:
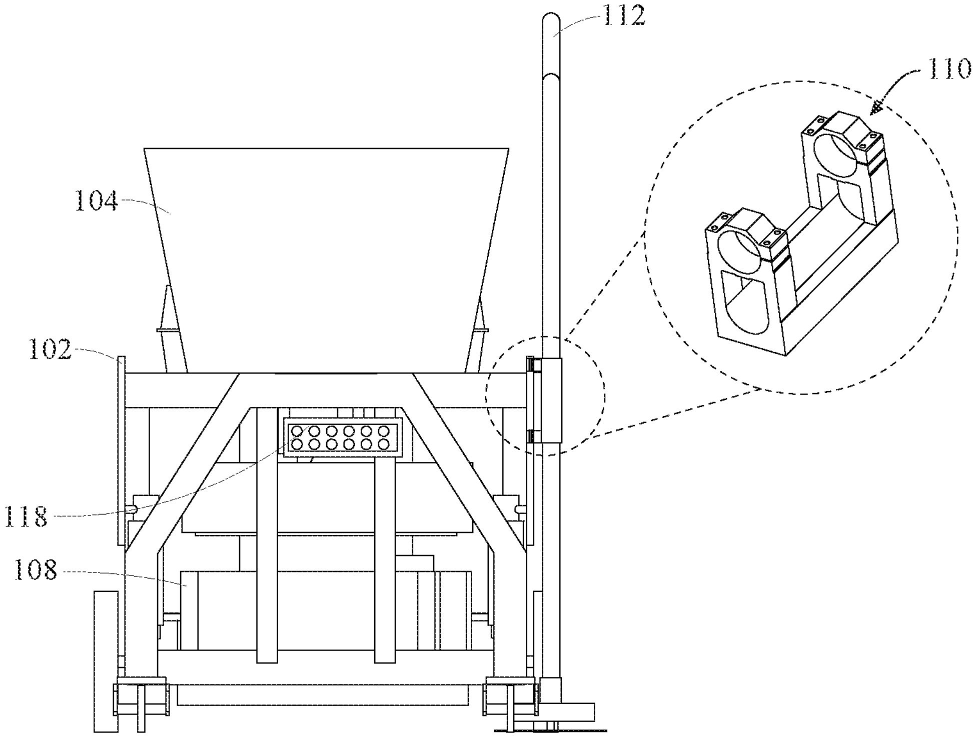
FIG. 10 shows an exemplary configuration of a third attachment to be affixed on at least one side of the base chassis of the multi-utility modular device, in accordance with some embodiments of the present disclosure.

FIG. 10 shows an exemplary configuration of the third attachment 110 to be affixed on at least one side of the base chassis 102 of the multi-utility modular device 100, in accordance with some embodiments of the present disclosure. The third attachment 110 may be used in various applications to securely couple or mount the one or more accessories 112, to the base chassis 102. The third attachment 110 may be designed to provide a stable and secure attachment point for the one or more accessories 112 to the base chassis 102. The third attachment 110 may be of various shapes, sizes, and configurations, thus being versatile and adaptable to different mounting requirements. The third attachment 110 may also be designed for straightforward installation, often requiring standard fasteners such as screws, bolts, or clips. Further, the third attachment 110 may also be engineered to be compatible with specific accessories or equipment, ensuring a perfect fit and proper functionality.

Furthermore, the third attachment 110 may comprise the at least one third mounting bracket configured to removably couple the one or more accessories 112, to the base chassis 102, where the one or more accessories 112 may comprise, but not limited to, the weed-eater or the leaf-blower. The third attachment 110 may also offer adjustability features, such as tilt, swivel, or height adjustments, thus allowing the users to adjust the position or angle of the one or more accessories 112 removably coupled to the base chassis 102. The third attachment 110 may also be designed to support specific weight capabilities, ensuring that the third attachment 110 may handle the load of the attached accessories 112 safely and without deformation.

Figure 11:
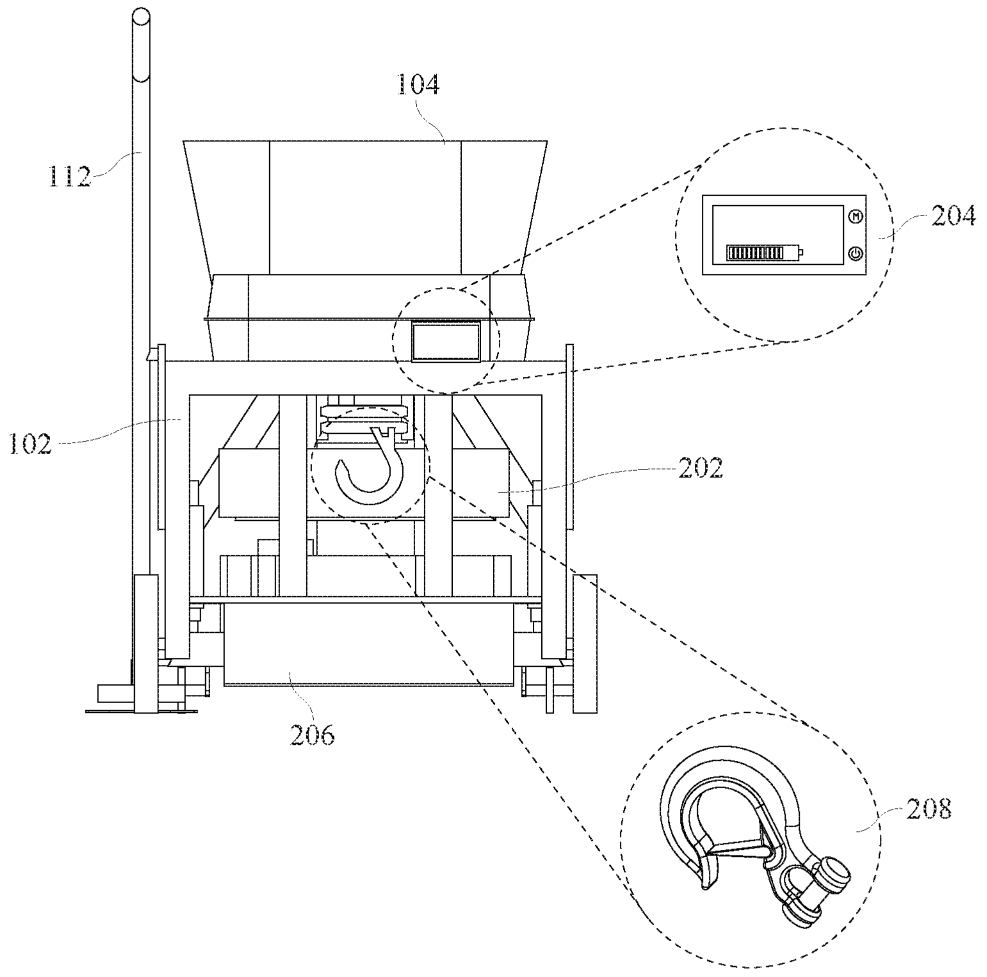
FIG. 11 shows an exemplary configuration of a smart battery monitor and an exemplary hook mounted on the rear side of the multi-utility modular device, in accordance with some embodiments of the present disclosure.

FIG. 11 shows an exemplary configuration of the smart battery monitor 204 and the exemplary hook 208 mounted on the rear side of the multi-utility modular device 100, in accordance with some embodiments of the present disclosure. The smart battery monitor 204 may indicate one or more of battery health, temperature, and remaining power of the battery 202 of the multi-utility modular device 100. The smart battery monitor 204 may also comprise a control panel or a display unit to allow the users to access and control the battery information conveniently. The hook 208 may securely hold various items, enabling the users to optimize the outdoor tasks by having essential tools and accessories readily available. The smart battery monitor 204 and the hook 208 are described above in detail in relation to FIG. 2.

Figure 12A:
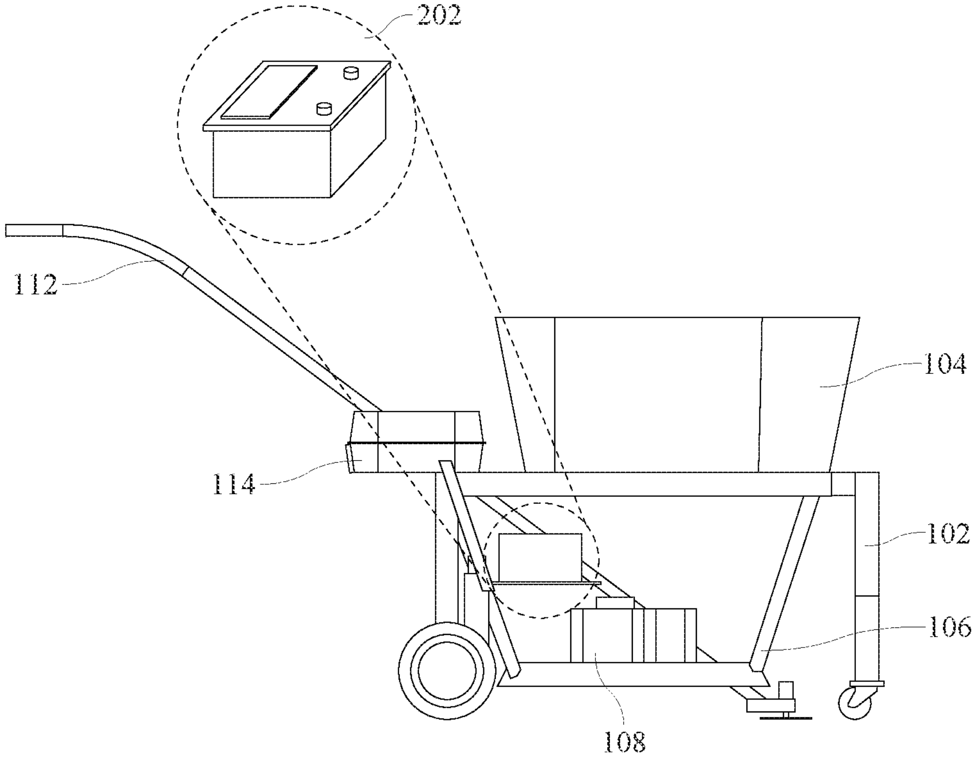
FIGS. 12A and 12B show exemplary configurations of power supplies of the multi-utility modular device, in accordance with some embodiments of the present disclosure.
Figure 12B:
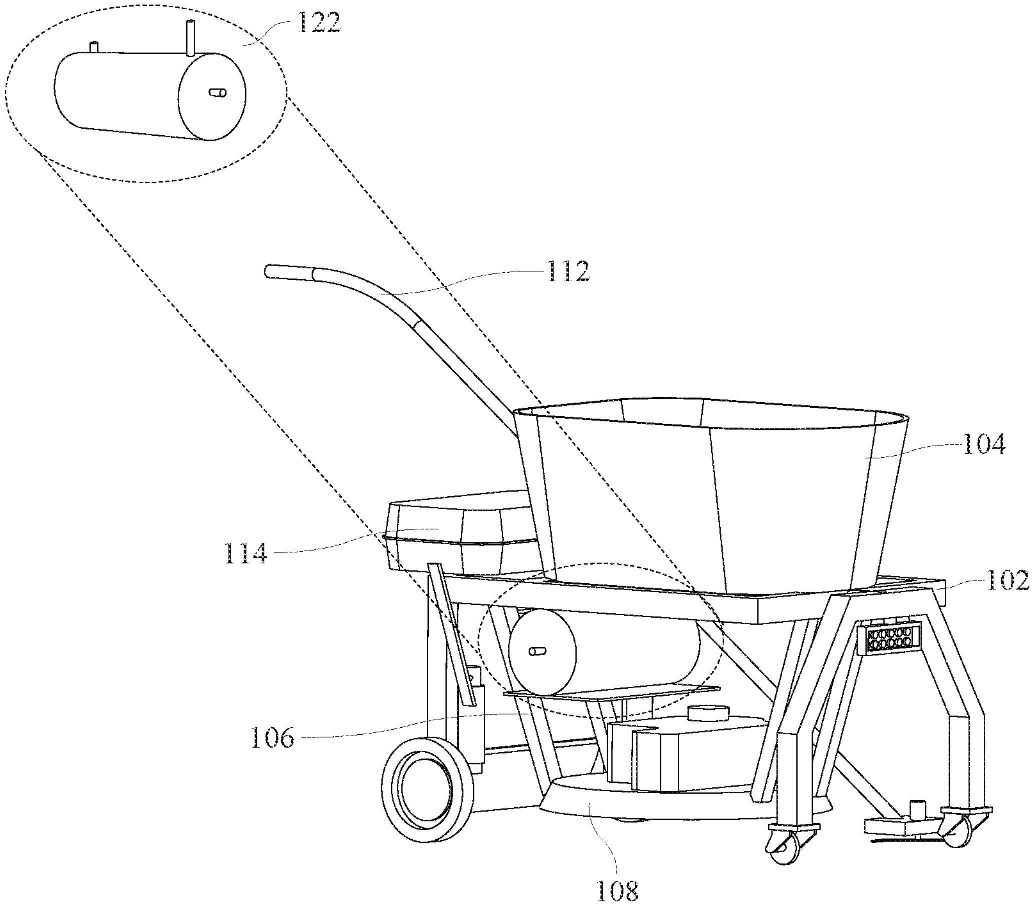

FIGS. 12A and 12B show exemplary configurations of the battery power supply 202 and a gas power supply 122 of the multi-utility modular device 100, in accordance with some embodiments of the present disclosure. The multi-utility modular device 100 may incorporate the battery power supply 202 to ensure versatility, portability, and efficiency in various functions. By integrating a high-quality and rechargeable battery 202 into the design, the modular device 100 may become independent of direct electrical connections.

The battery power supply 202 may be utilized to energize an electric motor or motors integrated into the modular device 100. The battery power supply 202 may enable the modular device 100 to be self-propelled, thereby enabling the modular device 100 to easily navigate in various terrains. The battery power supply 202 may also provide the necessary power to the LED headlight 118 to ensure safe and efficient use in any lighting situation. The battery power supply 202 may also serve as the source of electricity for various accessories, such as cameras, sensors, or smart battery monitor 204. The modular device 100 may also incorporate smart power management system to optimize battery usage, extending the operating time and ensuring that power is allocated efficiently across different functions.

Furthermore, the gas power supply 122 may utilize gasoline or other fuel sources to provide the energy needed to the multi-utility modular device 100. The modular device 100 may be equipped with a gas-powered internal combustion engine, which serves as the primary source of power for the gas power supply 122. The internal combustion engine runs on gasoline and converts the chemical energy in the fuel into mechanical energy to drive various components of the modular device 100. Gasoline engines may offer higher power output compared to the electric counterparts. The higher power capacity may render the multi-utility modular device 100 suitable for heavy-duty tasks and large-scale applications.

FIG. 13 shows an exemplary configuration of an at least one first adjustable extension arm 132 of the multi-utility modular device 100, in accordance with some embodiments of the present disclosure. The at least one first adjustable extension arm 132 is configured to allow removable coupling of the one or more objects 104 on the top of the base chassis 102, wherein the one or more objects 104 comprise a dump-bed, a cart, a lifting table, a seating arrangement, a tool-box, work-stations, or planters. The at least one first adjustable extension arm 132 is similar in functioning and configuration to the at least one second adjustable extension arm 106.

The at least one first adjustable extension arm 132 may also be configured to allow upward and downward vertical movement of the one or more objects 104 removably coupled on the top of the base chassis 102. The at least one second adjustable extension arm 106 may also be configured to allow upward and downward vertical movement of the lawnmower 108 removably coupled on the bottom of the base chassis 102. One or more of the at least one first adjustable extension arm 132 may be employed to removable couple the one or more objects 104 on the top of the base chassis 102. One or more of the at least one second adjustable extension arm 106 may be employed to removable couple the lawnmower 108 on the bottom of the base chassis 102 under the one or more objects 104.

The at least one first adjustable extension arm 132 and the at least one second adjustable extension arm 106 may be coupled to the base chassis 102 of the multi-utility modular device 100 by using the first attachment and the second attachment respectively. The at least one first adjustable extension arm 132 and the at least one second adjustable extension arm 106 may be configured to be adjusted to different lengths, angles, or positions, allowing the users to adjust the one or more objects 104 or the lawnmower 108 to a specific position or angle. Heights of the at least one first adjustable extension arm 132 and the at least one second adjustable extension arm 106 may also be altered to adapt the modular device 100 to different user heights or specific tasks.

Figure 14:
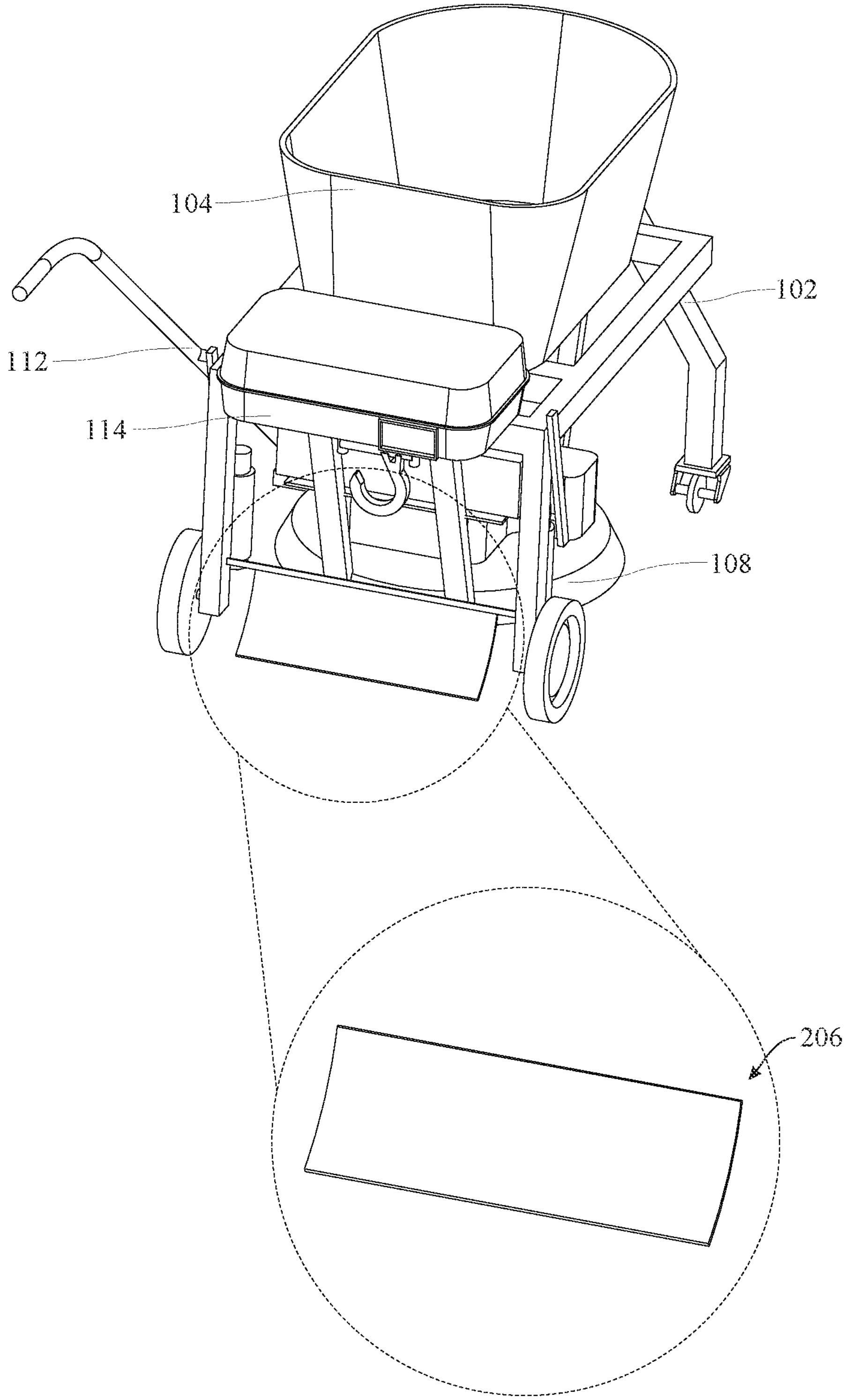
FIG. 14 shows an exemplary configuration of tiller/cultivator/snowblade mounted on the rear side of the multi-utility modular device, in accordance with some embodiments of the present disclosure.

FIG. 14 shows an exemplary configuration of the tiller/cultivator/snowblade 206 mounted on the rear side of the multi-utility modular device 100, in accordance with some embodiments of the present disclosure. The tiller/cultivator/snowblade 206 may be particularly useful for aerating the soil, removing weeds, and incorporating fertilizers or compost. The tiller/cultivator/snowblade 206 may also work as a robust snow removal tool. The combination of the multi-utility modular device 100 with the tiller/cultivator/snowblade 206 may create a dynamic tool capable of performing multiple functions, minimizing the need for separate equipment, and streamlining outdoor tasks. The details related to the tiller/cultivator/snowblade 206 are provided above in relation to FIG. 2. The details are not repeated here for the sake of brevity.

FIGS. 15A, 15B, and 15C show exemplary configurations of a lifting table 150 mounted on the top of the base chassis 102 of the multi-utility modular device 100, in accordance with some embodiments of the present disclosure. The lifting table 150 may comprise one or more configurations such as a retracted configuration 152, an elevated configuration 154, or may be configured as an elevated work platform 156. The lifting table 150 may also comprise a seating arrangement 158 for the user.

The lifting table 150 may be designed to be adjustable and may be positioned in any of the one or more configurations as per different tasks or requirements. In the retracted configuration 152, the lifting table 150 may sit flush with the base chassis, preserving the compact form and ensuring ease of transportation and storage. In the elevated configuration 154, the lifting table 150 may be transformed into a practical work platform. The elevated configuration 154 may allow users to position the lifting table 150 at a convenient height for tasks like potting plants, conducting repairs, or organizing materials. The elevated configuration 154 may save users from having to bend or kneel, reducing back strain and promoting better ergonomics during work. The at least one first adjustable extension arm 132 may be configured to allow upward movement of the lifting table 150 in the elevated configuration 154.

The elevated work platform configuration 156 may serve as a stable and secure platform for various tasks, expanding the utility of the modular device 100 beyond standard functions. Users may use the platform for activities that require a flat and elevated surface, making the modular device 100 suitable for gardening, carpentry, painting, and more. In the elevated work platform configuration 156, the lifting table 150 may be securely locked in place to ensure user safety and stability during work.

The lifting table 150 is removably coupled on the top of the base chassis 102 of the multi-utility modular device 100 using the at least one first adjustable extension arm 132. The at least one first adjustable extension arm 132 may allow smooth and controlled adjustment of the lifting table 150 in various configurations. The integration of the lifting table 150 on the top of the base chassis 102 may maximize space utilization and minimize the need for additional equipment or work platforms in outdoor tasks. Further, the lifting mechanism may include hydraulic, pneumatic, or manual systems, depending on the design and capability of the modular device 100.

FIG. 16 shows an exemplary heavy load cart 160 removably coupled on the top of the base chassis 102 of the multi-utility modular device 100, in accordance with some embodiments of the present disclosure. The base chassis 102 comprises the first attachment (also provided above in detail in relation to FIG. 1), comprising the at least one first adjustable extension arm 132 (shown in the FIG. 13 and FIGS. 15A-15C), configured to allow removable coupling of the one or more objects 104 on the top of the base chassis 102. The one or more objects 104 may comprise the heavy load cart 160.

By removably coupling the heavy load cart 160 on the top of the base chassis 102, the multi-utility modular device 100 be utilized in heavy-duty gardening, landscaping, construction, and material transport tasks. Further, the heavy load cart 160 may significantly expand the carrying capacity of the modular device 100, allowing the modular device 100 to transport heavy loads of materials, equipment, or tools with ease over different terrains. The open design of the heavy load cart 160 may further facilitate easy loading and unloading of items, streamline the handling process and save time during operations.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A multi-utility modular device, comprising:

a base chassis, wherein the base chassis comprises:

a first attachment, comprising at least one first adjustable extension arm, configured to allow removable coupling of one or more objects on the top of the base chassis, wherein the one or more objects comprise one or more of: a dump-bed, a cart, a lifting table, a seating arrangement, a tool-box, a work-station, and a planter;

a second attachment, comprising at least one second mounting bracket affixed to the base chassis and at least one second adjustable extension arm with a drop-design structure, configured to allow removable coupling of a lawnmower on the bottom of the base chassis under the one or more objects, and configured to allow upward and downward vertical movement of the lawnmower removably coupled on the bottom of the base chassis; and a third attachment configured to allow removable coupling of one or more accessories on at least one side of the base chassis, wherein the one or more accessories comprise one or more of: a weed-eater or a leaf blower.

2. The device of claim 1, wherein the first attachment comprises at least one first mounting bracket affixed to the base chassis, and wherein the at least one first adjustable extension arm is configured to allow upward and downward vertical movement of the one or more objects removably coupled on the top of the base chassis.

3. The device of claim 1, wherein the third attachment comprises at least one third mounting bracket affixed to the base chassis.

4. The device of claim 3, wherein the third mounting bracket is a quick-release mounting bracket.

5. The device of claim 1, further comprising:

a remote-control functionality for remote operation and control of movement of the multi-utility modular device.

6. The device of claim 1, further comprising:

an LED headlight mounted on a front side of the base chassis.

7. The device of claim 1, further comprising:

a weather proof protective case.

8. The device of claim 1, further comprising:

a winch mechanism.

9. A multi-utility modular device, comprising:

a base chassis;

a plurality of adjustable extension arms to allow removable coupling of a lawnmower on the bottom of the base chassis, and an object on the top of base chassis, wherein the plurality of adjustable extension arms comprises a first extension arm, and a second extension arm, with a drop-design structure, configured to allow removable coupling of the lawnmower on the bottom of the base chassis under the object and configured to allow upward and downward vertical movement of the lawnmower removably coupled on the bottom of the base chassis; and at least one mounting bracket configured to allow removable coupling of one or more accessories on one or more sides of the base chassis.

10. The device of claim 9, wherein the first extension arm is configured to allow removable coupling of: a dump-bed, a cart, a lifting table, a seating arrangement, a tool-box, a work-station, or a planter on the top of the base chassis.

11. The device of claim 9, wherein the at least one mounting bracket is affixed to the one or more sides of the base chassis and is configured to allow removable coupling of one or more of a weed-eater and a leaf blower on the one or more sides of the base chassis.

12. The device of claim 9, further comprising:

a tiller, cultivator, or a snowblade mounted on the rear side of the device.

13. A multi-utility modular device, comprising:

a base chassis;

one or more objects removably coupled on the top of the base chassis;

a lawnmower on the bottom of the base chassis under the one or more objects;

one or more accessories removably coupled on at least one side of the base chassis;

a first adjustable extension arm configured to allow removable coupling of the one or more objects;

a second adjustable extension arm, with a drop-design structure, configured to allow removable coupling of the lawnmower and configured to allow upward and downward vertical movement of the lawnmower removably coupled on the bottom of the base chassis; and an attachment configured to allow removable coupling of the one or more accessories.

14. The device of claim 13, wherein the one or more objects comprise one or more of: a dump-bed, a cart, a lifting table, a seating arrangement, a tool-box, a work-station, and a planter.

15. The device of claim 13, wherein the one or more accessories comprise one or more of: a weed-eater and a leaf blower.

16. The device of claim 13, wherein the first adjustable extension arm is configured to allow upward and downward vertical movement of the one or more objects.

17. The device of claim 13, further comprising:

a first mounting bracket corresponding to the first adjustable extension arm, a second mounting bracket corresponding to the second adjustable extension arm, and a third mounting bracket corresponding to the attachment.

* * * * *